United States Patent
Middleton et al.

(10) Patent No.: US 9,850,084 B2
(45) Date of Patent: Dec. 26, 2017

(54) DETECTION OF PROCESS ABNORMALITIES IN A MEDIA PROCESSING SYSTEM

(71) Applicant: Kodak Alaris Inc., Rochester, NY (US)

(72) Inventors: Thomas G. Middleton, Scottsville, NY (US); Bruce A. Link, Rochester, NY (US); Daniel P. Phinney, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 14/919,556

(22) Filed: Oct. 21, 2015

(65) Prior Publication Data

US 2017/0113891 A1    Apr. 27, 2017

(51) Int. Cl.
   *B65H 7/02* (2006.01)
   *B65H 5/06* (2006.01)
   *B65H 43/00* (2006.01)
   *G01H 17/00* (2006.01)

(52) U.S. Cl.
   CPC .......... *B65H 7/02* (2013.01); *B65H 5/06* (2013.01); *B65H 43/00* (2013.01); *G01H 17/00* (2013.01); *B65H 2553/30* (2013.01)

(58) Field of Classification Search
   CPC ... B65H 7/00; B65H 7/02; B65H 7/18; B65H 7/20; B65H 2301/44318; B65H 2301/54; B65H 2511/20; B65H 2511/22; B65H 2511/224; B65H 2511/51; B65H 2511/50
   USPC .............................. 271/256, 258.01, 265.01
   See application file for complete search history.

(56) References Cited

U.S. PATENT DOCUMENTS

| | | | |
|---|---|---|---|
| 7,828,279 B2 | 11/2010 | Hammen | |
| 8,857,815 B2 | 10/2014 | Hongo et al. | |
| 2004/0013158 A1* | 1/2004 | Bazhenov | B65H 7/02 374/45 |
| 2006/0220305 A1 | 10/2006 | Serizawa et al. | |
| 2008/0001348 A1* | 1/2008 | Kawasaki | B41J 11/0095 271/259 |

(Continued)

FOREIGN PATENT DOCUMENTS

| | | |
|---|---|---|
| JP | 2006290580 A | 10/2006 |
| JP | 2014218373 A | 11/2014 |

OTHER PUBLICATIONS

International Search Report, dated Jan. 23, 2017 in International Application No. PCT/US2016/058077.

(Continued)

*Primary Examiner* — David H Bollinger
(74) *Attorney, Agent, or Firm* — Hogan Lovells US LLP

(57) ABSTRACT

Sheet media jams are detected along a media transport path by one or more vibration sensors that capture mechanical movements of components along the path that interact with the sheet media for driving or guiding the sheet media along the transport path. The detected vibrations during the advancing of the sheets are analyzed for distinguishing between detected vibrations associated with normal handling of the sheets and detected vibrations associated with abnormal handling of the sheets. An error condition can be signaled to a control system in response to distinguishing the detected vibrations associated with the abnormal handling of the sheets.

28 Claims, 11 Drawing Sheets

(56) References Cited

U.S. PATENT DOCUMENTS

| | | | |
|---|---|---|---|
| 2008/0141791 A1* | 6/2008 | Kawasaki | B65H 7/20 73/862.381 |
| 2009/0003857 A1* | 1/2009 | Kuramochi | B65H 7/02 399/45 |
| 2009/0079129 A1* | 3/2009 | Yamasaki | B65H 5/062 271/256 |
| 2010/0247117 A1* | 9/2010 | Tomatsu | B65H 5/26 399/21 |
| 2014/0015192 A1* | 1/2014 | Wakabayashi | B65H 7/12 271/110 |
| 2014/0251016 A1 | 9/2014 | Adams, Jr. et al. | |
| 2015/0336757 A1* | 11/2015 | Kumagai | B65H 3/02 271/265.01 |

OTHER PUBLICATIONS

Written Opinion dated Jan. 23, 2017 in International Application No. PCT/US2016/058077.

\* cited by examiner

DETECTION OF PROCESS ABNORMALITIES IN A MEDIA PROCESSING SYSTEM

TECHNICAL FIELD

The invention relates to media handling systems, including systems transporting sheet media for such processing purposes as printing, imaging, copying, sorting, arranging and binding, and more particularly to methods and apparatus for sensing medium handling problems during the separation, feeding, and transport of the sheet media for processing.

BACKGROUND OF THE INVENTION

Media processing apparatus, such as document scanners, copiers, printers, fax machines, and other media processing systems that obtains data from, or imprint images and text onto sheet media, include media transport systems to move the sheet media along a transport path. These media transport systems can sometimes jam as the sheet media moves along the media transport path due to problems or abnormalities in either the media processing apparatus or the sheet media itself. Before loading sheet media into the media transport path of a media processing apparatus, an operator typically removes staples, paper clips, or other fasteners used to hold sheet media containing two or more sheets together. However, sometimes the operator fails to remove or even notice these fasteners. Advancing the sheet media along the media transport path without removing the fasteners can cause significant damage to the sheet media, and can also damage the media transport path, imaging or printing system, or other information transfer system located along the media transport path. In addition, removal of the fasteners, particularly staples, can damage the sheet media before the media is loaded, such that two or more sheets remain attached as they are fed into the transport path. If two or more sheets remain attached together with a fastener or as a result of residual damage caused by the removal of the fastener, then the intended processing of the sheet media can be compromised. For example, a failure to independently image the individual sheets in a document scanner can lead to a loss of information.

While systems have been implemented to check for staples, paper clips, or other fasteners binding sheet media together before the sheet media are transported from an input tray into a scanner device, their scope of detection can be limited and they sometimes fail to detect the fasteners binding sheet media transported into the scanner device. In these situations, jams still occur. In addition, these systems often fail to locate the position of a jam within the media transport system.

Some document handler systems detect the presence of staples in documents loaded into an input tray. However, such systems generally only look for staples in predetermined areas of the documents, and are only capable of detecting staples while the documents are in the input tray. Some documents do not fit into the input tray, and thus no staples in these documents would be detected before they are passed into the scanner. Additionally, many types of documents, including those of varying sizes, do not have a "preselected" area for a staple. Thus, the prior systems can miss staples in documents where staples are present but not in the preselected areas that are monitored.

In addition to the problems caused by fasteners, media processing apparatus are particularly prone to problems during the separation of the queued media in the input tray which can also be caused by poor document preparation or stacking, folds or wrinkles in the fed media sheets, different media weights and thicknesses, and other media-related problems, as well as problems with the media transport components themselves, caused by wear, dust and dirt, and other factors. These problems can be particularly acute with high-speed media processing apparatus or with media processing apparatus that handle fragile media. Failure to detect a problem with the handling of the media in time can damage the original media, causing loss of data, require special handling to correct the problem, and reduce equipment efficiency due to down time.

Various approaches have been used for monitoring the transport of sheet media in a media processing apparatus. Automatic media processing systems have used a range of different approaches of mechanical, optical, and audio sensors for the purpose of preventing damage to media being processed.

In one approach, the sound sheet media makes as it moves along media transport path can be used to diagnose the condition of the sheet media. Quiet or uniform sounds can indicate a normal or problem-free passage of the sheet media along the media transport path. Loud, unexpected, or non-uniform sounds can indicate a disruption in the passage of the sheet media such as a stoppage due to jamming or tearing, or physical damage of the sheet media.

Other known methods of detecting jams include using optical or mechanical sensors to monitor the times at which the sheet media passes through various locations along the media transport path. If the sheet media does not arrive at a given location in a given amount of time after the start of transport, a sheet media jam is inferred. These sensors tend to have a limited range of detection, and several sensors are typically required along the media transport path to produce useful results.

Commonly assigned U.S. Pat. No. 8,857,815 describes placing a microphone near the beginning of a sheet media feed path in order to detect the sound of a sheet media jam in progress. The microphone signal is processed by counting the number of sound samples above a given threshold within a sampling window. If the count is sufficiently large, a sheet media jam is signaled. However, information is not provided about the location of the sheet media as it moves along the media transport path. Thus, although sound can be used to detect a jam in progress, information regarding the location of the jam is unavailable.

A need remains for a simple, fast and robust technique to monitor sheet media advanced by media transport systems for various abnormalities. These abnormalities may be caused, for example, by the presence or residual effects of binding objects, or by problems attributable to the presentation or condition of the media itself. There further exists a need for a simple, fast and robust technique to prevent damage to the media, the media transport systems, and the media processing apparatus, to avoid losses of information, and to reduce downtime. In addition, there remains a need for a fast and robust technique to indicate sheet media jams that also accurately identifies the location of the jams along the media transport path.

SUMMARY OF THE INVENTION

The invention is directed to a method and system of detecting abnormalities along the media transport path of document scanners and other media processing apparatus, such as the abnormalities caused by the presence or residual effects of binding objects, or by defects in the presentation or condition of the media itself. Preferably, such abnormalities are detected before the sheet media encounter any imaging systems, printing systems, or other information transfer systems located along the media transport path.

Appropriately positioned and mounted vibration detectors along the media transport path produce continuous signals, which may be communicated to a processor to detect various types of abnormalities detrimental to the intended functioning of media processing apparatus. Signal processing within the processor can distinguish vibrations indicative of abnormalities in the transport of media from vibrations accompanying the normal movements of media along the media transport path. Vibrations indicative of normal operations may be obtained by sensing vibrations at a time when the media transport system is known to be operating under normal conditions, and these sensed normal signals may be stored in a memory. Alternatively, the signals indicative of normal condition for implementing the comparison may be pre-stored in a memory accessible by the process, included in a program executed by the processor, other accessible from a server in communication with the processor. The vibrations which may be indicative of abnormalities can be monitored in a number of ways including sensing variations in the position, acceleration, or stress of components along the media transport path. Multiple vibration detectors may be positioned along the media transport path, particularly in association with different stages of media transport such as feeding media into the media handling system, advancing the media within the media transport, ejecting the sheet media into an output tray, or sorting the media into different output trays or positions. The signals from the detectors can be analyzed individually or collectively, to ascertain or even anticipate sources of malfunction or performance concerns.

The detection and characterization of the abnormalities provides information that may be used to optimize operation of the media processing apparatus, including halting the further transport of the media if there is a suspected jam, undue stress, or risk to components of the media processing apparatus. Automated interventions can be implemented to identify, protect, or even bypass media responsible for the detected abnormality. Warnings or alerts can be issued or logged to identify the media or information contained thereon that may have been compromised, or the components that may have been subject to wear, stress, misalignment, or damage. For example, if the document jams in the transport, the scanned image may not be readable. As another example, if the speed of the document moving through the transport changes, the scanned image may be incomplete or compromised.

The method and system described herein may also include sensor systems of different types, such as sensor systems for detecting both sounds' transmitted through the air and vibrations propagating in supporting structures.

Damage to sheet media during transport though a media processing apparatus may be avoided by advancing the sheets with a transport apparatus from a queue mechanism through one or more media processing stages to an ejection mechanism. Rollers, which are rotatably supported in support structures of the transport apparatus, engage the sheets for driving or guiding the sheets. Vibrations propagating in one of the support structures may be detected with one or more sensors mounted on the support structure, or nearby the support structure. Data from the sensors is provided to a processing system, which analyzes the detected vibrations during the advancing of the sheets for distinguishing between detected vibrations associated with normal handling of the sheets and detected vibrations associated with abnormal handling of the sheets. Based on this analysis, damage to the sheet media can be avoided by signaling an error condition to a control system in response to distinguishing the detected vibration associated with the abnormal handling of the sheets.

The media processing apparatus may also include one or more media processing stages and a transport apparatus for advancing the sheets from a queue mechanism through the one or more media processing stages to an ejection mechanism. The transport apparatus includes rollers for engaging the sheets and support structures for rotatably supporting the rollers. Sensors mounted on one or more of the support structures detect vibrations propagating in the support structures. A processing system analyzes the detected vibrations during the advancing of the sheets, and distinguishes between detected vibration associated with normal handling of the sheets and detected vibration associated with abnormal handling of the sheets. A control unit receives an error condition signal from the processing system in response to the analysis associating the detected vibration with the abnormal handling of the sheets.

BRIEF DESCRIPTION OF THE FIGURES

FIG. 4B is a continuation of the view of the block diagram from FIG. 4A, as indicated on the drawings.

DETAILED DESCRIPTION OF THE INVENTION

The present invention is directed to systems and methods for the detection of abnormalities involving media transported through a media transport system. Vibration detectors detect vibration profiles associated with media, typically documents, being transported through the media transport system. A processor analyzes these vibration profiles to determine the occurrence and location of potential malfunctions, such as paper jams, or other performance concerns. The processing can be carried out using an instruction set implemented within a programmable computer that can include one or more non-transitory, tangible, computer readable storage media. For example, the programmable computer may include magnetic or optical storage media, solid-state electronic storage devices such as random access memory (RAM), or read-only memory (ROM), or any other physical device or media employed to store the instructions for carrying out the desired processing. In addition, the instructions may be embedded in a machine readable bar code, which is read by an imaging device and processed by the programmable computer.

The system and method may be implemented with document handling equipment for imaging apparatus including document scanners, and equipment of other types, such as copiers, fax machines, printers, binding devices, and other systems. A document feed tray, or other member for receiving a document as a stack of serial-fed sheets, can include single-sheet feed, top feed, bottom feed, or other serial feed configurations.

Figure 1:
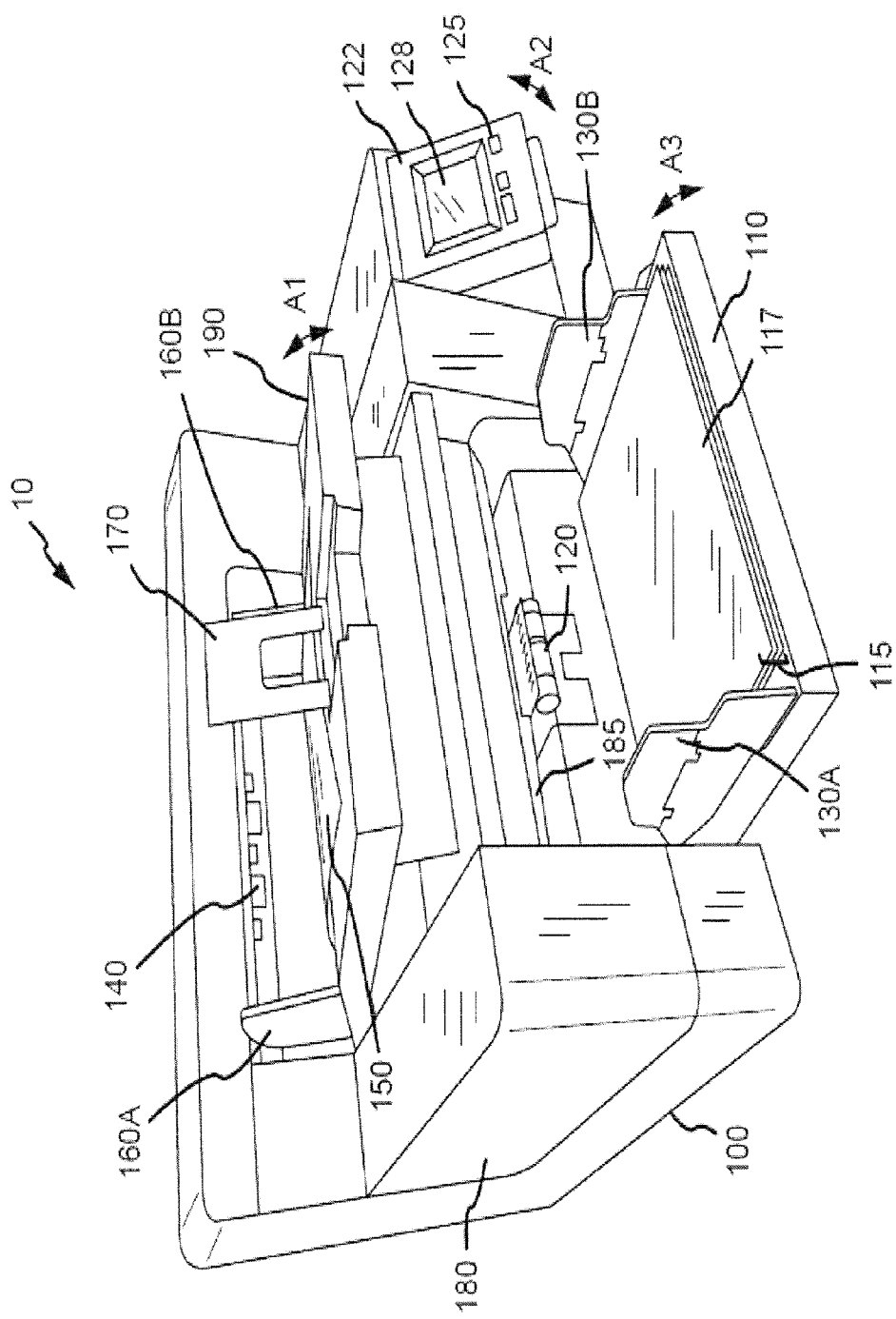
FIG. 1 is a diagram showing the components of a media processing apparatus in the form of a document scanner.

A media processing apparatus is depicted in FIG. 1 as a document imaging scanner 10 includes a scanner base 100, a scanner pod 180, an input tray 110, an output tray 190, and an operator control panel 122. The scanner pod 180 covers a top surface of the document scanner 10 and connects to the scanner base 100 with hinges. The hinges allow the document scanner 10 to be opened and closed when there is a media jam within the document scanner 10 or when the document scanner 10 needs to be cleaned.

The input tray 110 can be opened at times of scanning and closed when the document scanner 10 is not in use, as illustrated by arrow A3. When the input tray 110 is closed, the footprint of the document scanner 10 can be reduced. Sheet media 115 to be scanned can be placed into the input tray 110. Examples of such sheet media 115 include paper documents, photographic film, and magnetic recording media. Top sheet medium 117 is the medium at the top of a stack of sheet media 115, and is the next sheet medium to be pulled into the document scanner 10 by an urging roller 120. The input tray 110 is provided with input side guides 130a and 130b, which can be moved in a direction perpendicular to a transport direction of the sheet media 115. By positioning the side guides 130a and 130b to match the width of the sheet media 115, movement of the sheet media 115 in the input tray 110 is reduced and the position of the sheet media 115 (e.g., left, right or center justified) for initiating automated transport is set. The input side guides 130a and 130b can be referred to collectively as the input side guides 130. The input tray 110 can be attached to a motor (not shown) that causes the input tray 110 to raise the top sheet medium 117 into engagement with the urging roller 120 for initiating automated transport or to lower the input tray 110 to allow additional sheet media 115 to be added to the input tray 110.

The output tray 190 is connected to the scanner pod 180 by hinges, allowing an angle of the output tray 190 to be adjusted as shown by the arrow marked A1. The output tray 190 is provided with output side guides 160a and 160b which can be moved in a direction perpendicular to a transport direction of the sheet media 115, that is, to the left and right directions from the transport direction of the sheet media 115. By positioning the output side guides 160a and 160b to match with the width of the sheet media 115, it is possible to limit the movement of output sheet media 150 in the output tray 190. The output side guides 160a and 160b can be referred to collectively as the output side guides 160. An output tray stop 170 is provided to stop the top sheet medium 117 after being ejected by the output transport rollers 140. When the output tray 190 is in the up state as shown in FIG. 1, the ejected sheet media is trail-edge aligned. In the down state, the ejected sheet media is lead-edge aligned against the output tray stop 170.

The operator control panel 122 is attached to the scanner base 100 or scanner pod 180, and can be tilted as shown by the arrow marked A2 to allow optimal positioning for an operator. An operator input 125 is arranged on the surface of the operator control panel 122, allowing the operator to input commands such as start, stop, and override. The operator input 125 can include one or more buttons, switches, portions of a touch-sensitive panel, selectable icons on an operator display 128, or other selectable input mechanism. The override command can allow the operator to temporarily disable multi-feed detection, jam detection, or other features of the document scanner 10 while scanning. The operator control panel 122 also includes an operator display 128 that allows information and images to be presented to the operator. As noted above, the operator display 128 can include selectable icons relating to commands and operations of the document scanner 10. The operator control panel 122 can also contain speakers and LEDs (not shown) to provide additional feedback to the operator.

Figure 2:
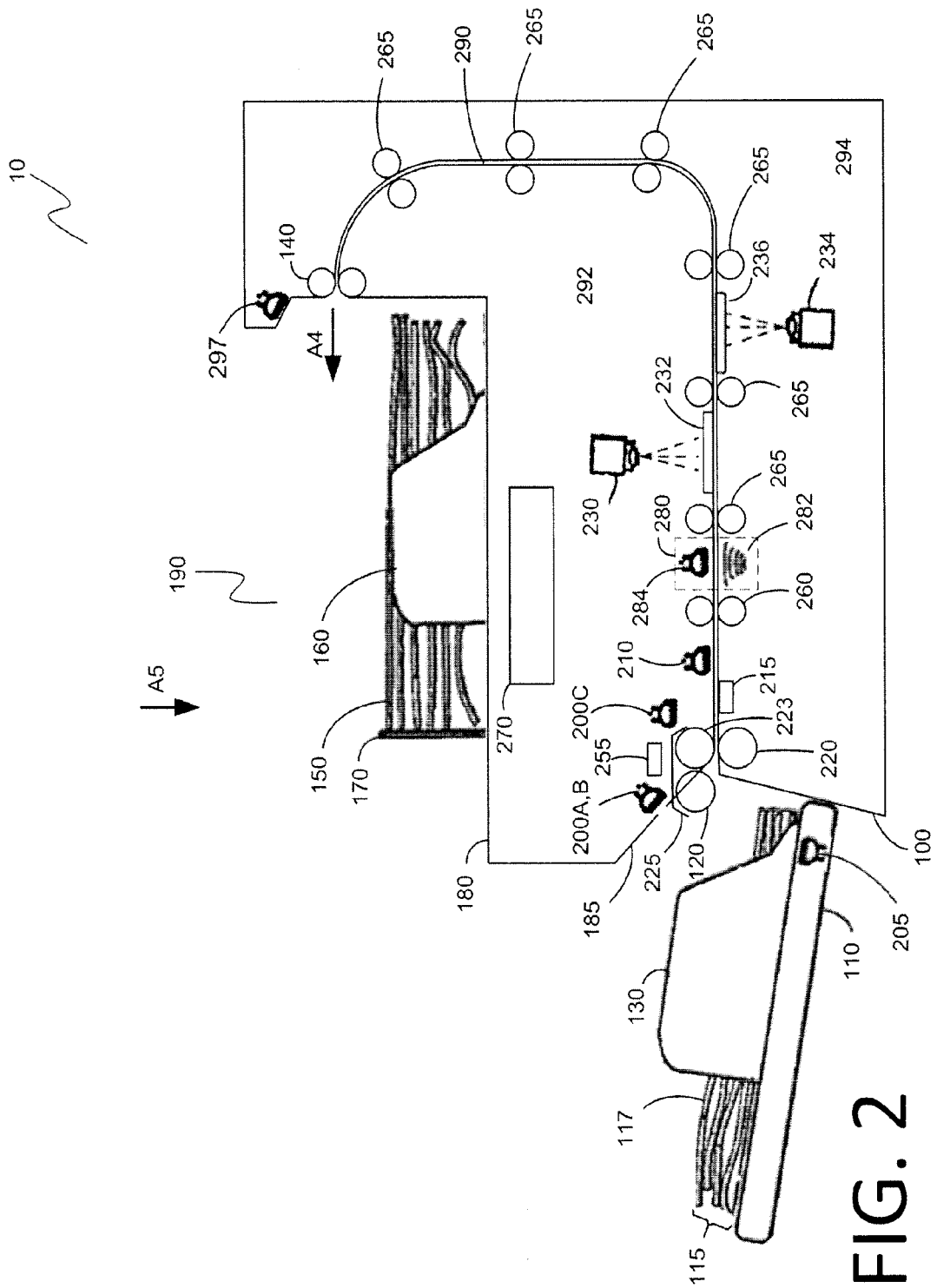
FIG. 2 is a diagram showing components of a media transport system of the media processing apparatus of FIG. 1.

FIG. 2 illustrates a media transport path 290 inside of the document scanner 10. A plurality of rollers are positioned along the media transport path 290, including an urging roller 120, a feed roller 223, a separator roller 220, take-away rollers 260, transport rollers 265, and output transport rollers 140. The urging roller 120 and feed roller 223 can be referred to collectively as a feed module 225. A vibration sensor 255, microphones 200a, 200b, 200c, a first media sensor 205, a second media sensor 210, an induction sensor 215, an ultrasonic transmitter 282, and an ultrasonic receiver 284 are positioned along the media transport path 290 to sense sheet media within the media transport path 290, for example as the top sheet medium 117 is transported along the media transport path 290. A pod image acquisition unit 230 and a base image acquisition unit 234 are included to capture images of the sheet media.

The top surface of the scanner base 100 forms a lower media guide 294 of the media transport path 290, while the bottom surface of the scanner pod 180 forms an upper media guide 292 of the media transport path 290. A delta wing 185 can be provided which helps to guide the sheet media from the input tray 110 into the media transport path 290. As shown in FIG. 2, the delta wing 185 can be arranged as a removable section of the upper media guide 292, transitioning from the upper media guide 292 to the scanner cabinetry of the scanner pod 180. The delta wing 185 can be angled to allow microphones 200 A, B to point into the input tray 110, thereby improving signal pickup.

In FIG. 2, the arrow A4 shows the transport direction that the sheet media travels within the media transport path 290. As used herein, the term "upstream" refers to a position relative to the transport direction A4 that is closer to the input tray 110, while "downstream" refers to a position relative to the transport direction A4 that is closer to the output tray 190. The first media sensor 205 has a detection sensor which is arranged at an upstream side of the urging roller 120. The first media sensor 205 can be mounted within the input tray 110, and detects if sheet media 115 is placed on the input tray 110. The first media sensor 205 can be of any form known to those skilled in the art including, but not limited to, contact sensors and optical sensors. The first media sensor 205 generates and outputs a first media detection signal which changes in signal value depending on whether or not media is placed on the input tray 110.

The first microphone 200a, second microphone 200b, and third microphone 200c are examples of sound detectors that detect the sound generated for example by the top sheet medium 117 during transport through the media transport path 290. The microphones generate and output analog signals representative of the detected sound. The microphones 200a and 200b are arranged to the left and right of the urging roller 120 while fastened to the delta wing 185 at the front of the scanner pod 180. The microphones 200a and 200b are mounted so as to point down towards the input tray 110. To enable the sound generated by for example the top sheet medium 117 during transport of the sheet media to be more accurately detected by the first microphone 200a and the second microphone 200b, a hole is provided in the delta wing 185 facing the input tray 110 in order to improve the ability of first microphone 200a and second microphone 200b to detect sound. The microphones 200a and 200b are mounted to the delta wing 185 using a vibration reducing gasket. The third microphone 200c is at the downstream side of the feed roller 223 and the separator roller 220 while fastened to the upper media guide 292. A hole for the third microphone 200c is provided in the upper media guide 292 facing media transport path 290. The microphone 200c is mounted in the upper media guide 292 using a vibration reducing gasket. As an example, the microphones can be MEMS microphones mounted flush to a baffle with isolator material to reduce vibration transferring from the baffle to the MEMS. By mounting the MEMS flush, the amount of internal machine noise behind the microphone that can be detected by the microphone is reduced.

The second media detector 210 is arranged at a downstream side of the feed roller 223 and the separator roller 220 and at an upstream side of the take-away rollers 260. The second media detector 210 detects if there is a sheet medium present at that position. The second media detector 210 generates and outputs a second media detection signal which changes in signal value depending on whether sheet media is present at that position. The second media detector 210 can be of any form known to those skilled in the art including, but not limited to, contact sensors, motion sensor, and optical sensors.

One or more vibration sensors 255 are located within the media transport apparatus. A vibration sensor 255, which may be mounted on the upper media guide 292, is arranged proximate the feed module 225 on a common mount with the urging roller 120 and the feed roller 223. The vibration sensor 255 may be accelerometers, gyroscopes, or external foil strain gauges. A vibration sensor 255 is preferably mounted on a common platform with adjacent rollers 120, 223 of the feed module 225 so that disturbances associated with operative engagements between the sheet media and the feed roller 223 can be detected. A vibration sensor 255 may also be located in structural, solid-to-solid, connection to one or more guide surfaces that are subject to disturbances associated with the transport of the sheet media along the media transport path 290. For example, a vibration sensor 255 could be mounted on the delta wing 185, which helps to guide the sheet media from the input tray 110 into the media transport path 290. A vibration sensor 255 may also be located upstream of the take-away rollers 260 to provide localized detection of disturbances associated with the entry of the sheet media into the media transport path 290 so that problems with the sheet media or its transport can be detected before the sheet media engages more sensitive structures within the document scanner 10 or can interfere with the transport of succeeding sheet media.

The induction sensor 215, which is mounted on the lower media guide 294, is positioned downstream of the feed roller 223 and the separator roller 220 while upstream of take-away rollers 260 to further monitor the entry of the sheet media into the media transport path 290. The induction sensor 215 detects metal components, such as from staples or other fasteners, which might bind sheet media together or otherwise interfere with the intended further movement of the sheet media along the media transport path 290. The induction sensor 215 is also preferably located upstream of the take-away rollers 260 to provide detection of potentially disruptive metal components upon the initial entry of the sheet media into the media transport path 290

The ultrasonic transmitter 282 and the ultrasonic receiver 284, together forming an ultrasonic detector 280, are arranged near the media transport path 290 of the top sheet medium 117 so as to face each other across the media transport path 290. The ultrasonic transmitter 282 transmits an ultrasonic wave that passes through the top sheet medium 117 and is detected by the ultrasonic receiver 284. The ultrasonic receiver then generates and outputs a signal, which can be an electrical signal, corresponding to the detected ultrasonic wave.

A plurality of ultrasonic transmitters 282 and ultrasonic receivers 284 can be used. In this situation, the ultrasonic transmitters 282 are positioned across the lower media guide 294 perpendicular to the transport direction as marked by arrow A4 while ultrasonic receivers 284 are positioned across the upper media guide 292 perpendicular to the transport direction as marked by arrow A4.

The pod image acquisition unit 230 has an image sensor, such as a CIS (contact image sensor) or CCD (charged coupled device). Similarly, the base image acquisition unit 234 has an image sensor, such as a CIS or CCD.

As the top sheet medium 117 travels along the media transport path 290, it passes the pod imaging aperture 232 and the base imaging aperture 236. The pod imaging aperture 232 is a slot in the upper media guide 292 while the base imaging aperture 236 is a slot in the lower media guide 294. The pod image acquisition unit 230 images the top surface of the top sheet medium 117 as it passes the pod imaging aperture 232 and outputs an image signal. The base image acquisition unit 234 images the bottom surface of the top sheet medium 117 as it passes the base imaging aperture 236 and outputs an image signal. It is also possible to configure the pod image acquisition unit 230 and the base image acquisition unit 234 such that only one surface of the top sheet medium 117 is imaged.

The top sheet medium 117 is moved along a media transport path 290 by sets of rollers. The sets of rollers are composed of a drive roller and normal force roller. The drive roller is driven by a motor which provides the driving force to the roller. The normal force roller is a freewheeling roller that provides pressure to capture the top sheet medium 117 between the drive roller and normal force roller. In the document scanner 10, the initial drive and normal force rollers that grab the top sheet medium 117 for transport along the media transport path 290 are referred to as take-away rollers 260. The additional drive and normal force roller pairs along the media transport path 290 are referred to as transport rollers 265. The rollers can be driven by a single motor, where all the rollers start and stop together. Alternatively, the rollers can be grouped together, where each group is driven by its own motor. This allows different motor groups to be started and stopped at different times or run at different speeds.

The document scanner 10 can have output transport rollers 140. The output transport rollers 140 are connected to a separate drive motor that either speeds-up the top sheet medium 117 or slows down the top sheet medium 117 for modifying the way the output sheet media 150 is placed into the output tray 190, as described in detail, for example, in U.S. Pat. No. 7,828,279, which is hereby incorporated by reference.

Sheet media 115 placed on the input tray 110 is transported between the lower media guide 294 and the upper media guide 292 in the transport direction shown by arrow A4 by rotation of the urging roller 120. The urging roller 120 pulls the top sheet medium 117 out of the input tray 110 and pushes it into the feed roller 223. The separator roller 220 resists the rotation of the feed roller 223 such that when the input tray 110 has a plurality of sheet media 115 placed on it, only the top sheet medium 117 which is in contact with the feed roller 223 is selected for feeding into the media transport path 290. The transport of the sheet media 115 below the top sheet medium 117 is restricted by the separator roller 220 to prevent feeding more than one sheet medium at a time, which is referred to as a "multi-feed."

The top sheet medium 117 is fed between the take-away rollers 260 and is transported through the transport rollers 265 while being guided by the lower media guide 294 and the upper media guide 292. The top sheet medium 117 is sent past the pod image acquisition unit 230 and the base image acquisition unit 234 for imaging. The top sheet medium 117 is then ejected into the output tray 190 by the output transport rollers 140. In addition to microphones 200a, 200b, and 200c, a microphone 297 can be provided near the exit of the media transport path 290. This microphone 297 detects the sounds of the sheet media towards the end of the transport path, and as the sheet media is output into the output tray 190. These detected sounds can be used to detect jams occurring in the output tray 190 or as sheet media are exiting the media transport path 290. A system processing unit 270 monitors the state of the document scanner 10 and controls the operation of the document scanner 10 as described in more detail below.

Although FIG. 2 shows the urging roller 120 above the stack of sheet media 115 to select the top sheet media 117, in a feeding configuration often referred to as a "top feeding mechanism," other configurations can be used. For example, the urging roller 120, feed roller 223 and separator roller 220 can be inverted such that the urging roller selects the sheet medium at the bottom of the sheet media stack 115. In this configuration, microphones 200a and 200b can be moved into the scanner base 100. The vibration sensor 255 can also be mounted on the lower media guide 294.

Figure 3:
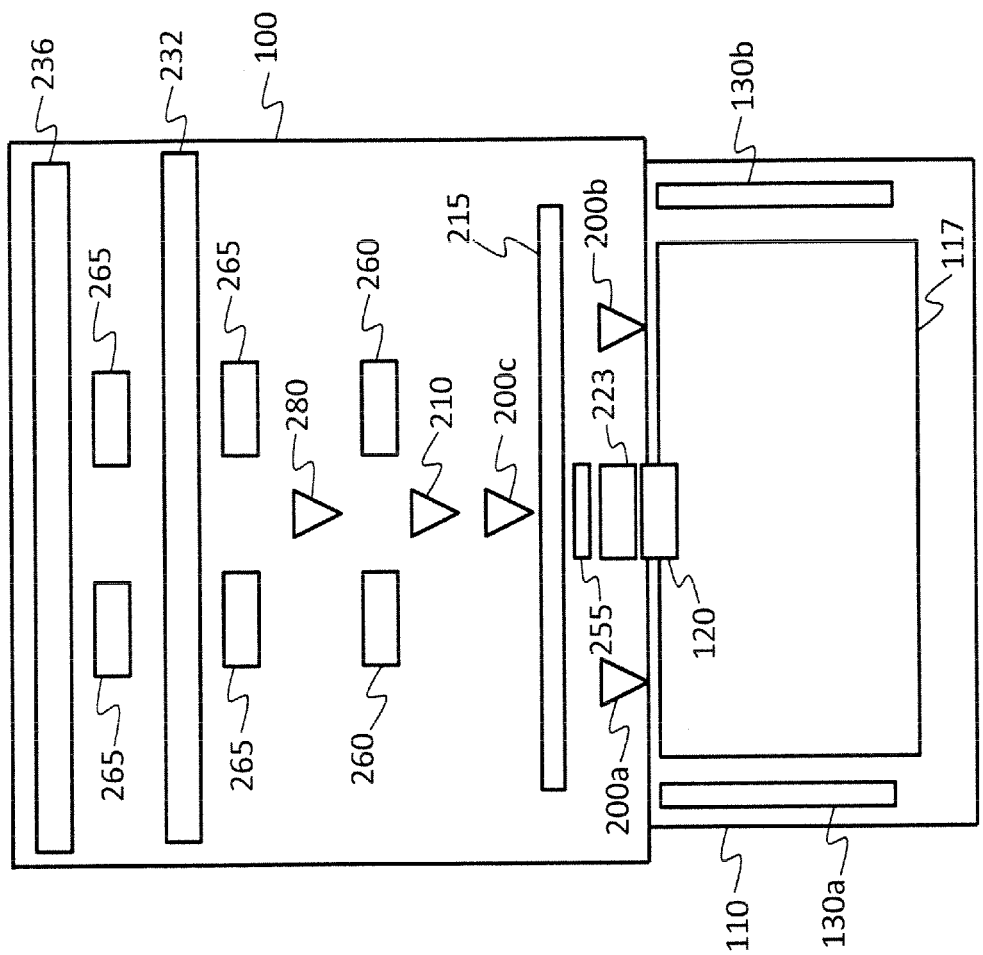
FIG. 3 is a diagram showing a flattened view of the components of the document scanner.

FIG. 3 is a block diagram of document scanner 10 as seen from the viewpoint shown by the direction arrow A5 in FIG. 2. As shown in FIG. 3, the first microphone 200a is provided to the left of the urging roller 120 and feed roller 223 along the delta wing 185. The second microphone 200b is provided to the right of the urging roller 120 and feed roller 223 along the delta wing 185. The placement of microphones 200a and 200b capture sound from the top sheet medium 117 as it is being urged into the feed roller 223 by the urging roller 120. The third microphone 200c is preferably located slightly behind and downstream of the feed roller 223. The placement of microphone 200c captures sound from the top sheet medium 117 as it passes the feed roller 223 and before reaching the take-away rollers 260.

The vibration sensor 255 is depicted in FIG. 3 downstream of the feed roller 223 but upstream of the third microphone 200c. Although mounted on the lower media guide 294 beneath the third microphone 200c, the induction sensor 215 is shown in FIG. 3 in a layout position between the vibration sensor 255 and the third microphone 200c. The induction sensor 215 preferably spans the full width of the sheet media to detect metal components that might be located in any area of the sheet media. The ultrasonic detector 280 is located downstream of the take-away rollers 260 and the upstream of the transport rollers 265. Additional sets of the transport rollers 265 straddle both the pod imaging aperture 232 and the base imaging aperture 236, which also preferably span the full width of the sheet media to capture graphical, text, or other types of information carried anywhere on the front or back sides of the sheet media.

Figure 4A:
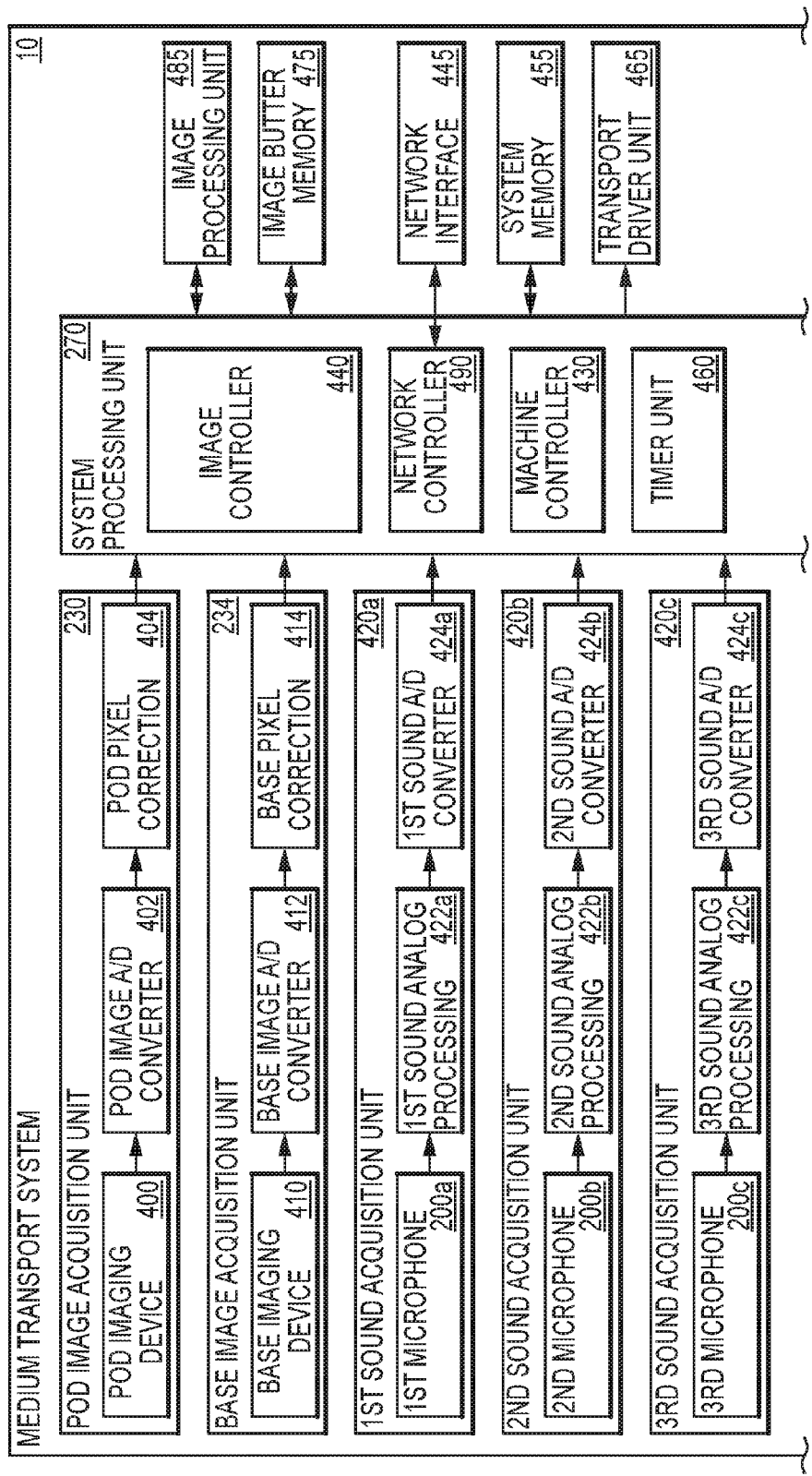
FIGS. 4A and 4B are a block diagram showing signal and information transfers of the document scanner.
Figure 4B:
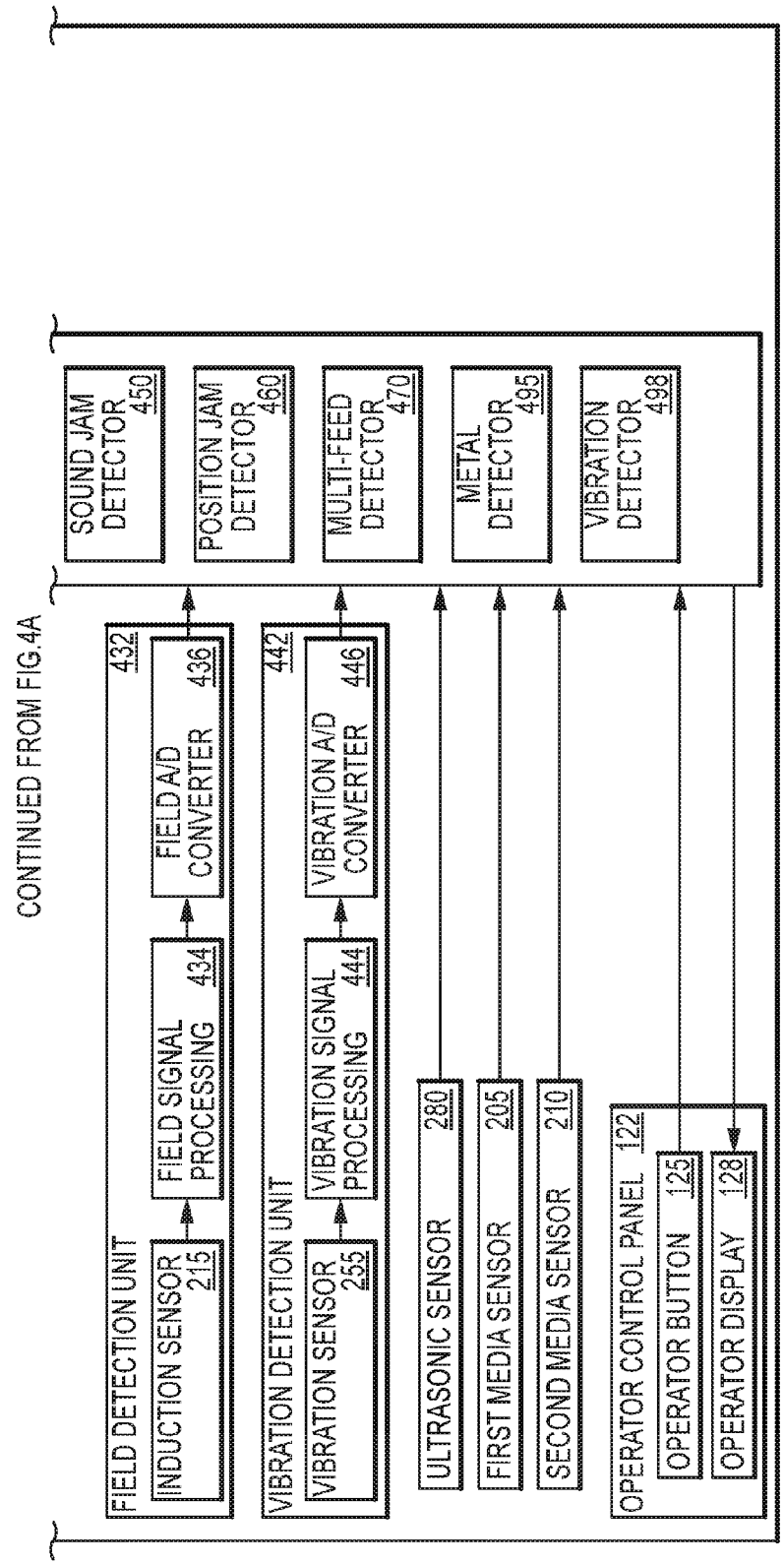

FIGS. 4A and 4B illustrate a block diagram of signal and information transfers within the document scanner 10. The pod image acquisition unit 230 is further composed of a pod image device 400, pod image A/D converter 402, and pod pixel correction 404. As noted above, the pod image device 400 has a CIS (contact image sensor) of an equal magnification optical system type, which is provided with an image capture device using CMOS (complementary metal oxide semiconductors). The elements of the image capture device are arranged in a line in a main scan direction, which is perpendicular to the media transport path 290 as shown by arrow A4. As noted above, instead of a CIS, it is also possible to use an image capturing sensor of a reduced magnification optical system type using CCD's (charge coupled devices). The pod imaging A/D converter 402 converts an analog image signal which is output from the pod image device 400 to generate digital image data, which is then output to the pod pixel correction 404. The pod pixel correction 404 corrects for any pixel or magnification abnormalities. The pod pixel correction 404 outputs the digital image data to the image controller 440 within the system processing unit 270. The base image acquisition unit 234 is further composed of a base image device 410, base image A/D converter 412, and base pixel correction 414. The base image device 410 has a CIS (contact image sensor) of an equal magnification optical system type, which is provided with an image capture device using CMOS's (complementary metal oxide semiconductors), the elements of which are arranged in a line in the main scan direction. As noted above, instead of a CIS, it is also possible to use an image capturing sensor of a reduced magnification optical system type using CCD's (charge coupled devices). The base image A/D converter 412 converts an analog image signal output from the base image device 410 to generate digital image data, which is then output to the base pixel correction 414. The base pixel correction 414 corrects for any pixel or magnification abnormalities. The base pixel correction 414 outputs the digital image data to the image controller 440 within the system processing unit 270. Digital image data from the pod image acquisition unit 230 and the base image acquisition unit 234 will be referred to as "captured images."

The operator configures the image controller 440 to perform the required image processing on the captured images either through the operator control panel 122 or network interface 445. As the image controller 440 receives the captured images, it sends the captured images to the image processing unit 485 along with a job specification that defines the image processing that should be performed on the captured images. The image processing unit 485 performs the requested image processing on the captured images and outputs processed images. It will be understood that the functions of image processing unit 485 can be provided using a single programmable processor or by using multiple programmable processors, including one or more digital signal processor (DSP) devices. Alternatively, the image processing unit 485 can be provided by custom circuitry (e.g., by one or more custom integrated circuits (ICs) designed specifically for use in digital document scanners), or by a combination of programmable processor(s) and custom circuits.

The image controller 440 manages image buffer memory 475 to hold the processed images until the network controller 490 is ready to send the processed images to the network interface 445. The image buffer memory 475 can be internal or external memory of any form known to those skilled in the art including, but not limited to, SRAM, DRAM, or Flash memory. The network interface 445 can be of any form known to those skilled in the art including, but not limited to, Ethernet, USB, Wi-Fi or other data network interface circuit. The network interface 445 connects the document scanner 10 with a computer or network (not shown) to send and receive the captured image. The network interface 445 also provides a means to remotely control the document scanner 10 by supplying various types of information required for operation of the document scanner 10. The network controller 490 manages the network interface 445 and directs network communications to either the image controller 440 or a machine controller 430.

A first sound acquisition unit 420a includes the first microphone 200a, a first sound analog processing 422a, and a first sound A/D converter 424a, and generates a sound signal responsive to the sound picked up by the first microphone 200a. The first sound analog processing 422a filters the signal output from the first microphone 200a by passing the signal through a low-pass or band-pass filter to select the frequency band of the interest. The first sound analog processing 422a also amplifies the signal and outputs it to the first sound A/D converter 424a. The first sound A/D converter 424a converts the analog signal which is output from the first sound analog processing 422a to a digital first source signal and outputs it to the system processing unit 270. As described herein, outputs of the first sound acquisition unit 420a are referred to as the "left sound signal." The first sound acquisition unit 420a can comprise discrete devices or can be integrated into a single device such as a digital output MEMS microphone.

A second sound acquisition unit 420b includes the second microphone 200b, a second sound analog processing 422b, and a second sound A/D Converter 424b, and generates a sound signal responsive to the sound picked up by the second microphone 200b. The second sound analog processing 422b filters the signal output from the second microphone 200b by passing the signal through a low-pass or band-pass filter to select the frequency band of the interest. The second sound analog processing 422b also amplifies the signal and outputs it to the second sound A/D converter 424b. The second sound A/D converter 424b converts the analog signal output from the second sound analog processing 422b to a digital second source signal and outputs it to the system processing unit 270. As described herein, outputs of the second sound acquisition unit 420b will be referred to as the "right sound signal." The second sound acquisition unit 420b can comprise discrete devices or can be integrated into a single device such as a digital output MEMS microphone.

A third sound acquisition unit 420c includes the third microphone 200c, a third sound analog processing 422c, and a third sound A/D Converter 424c, and generates a sound signal responsive to the sound picked up by the third microphone 200c. The third sound analog processing 422c filters the signal output from the third microphone 200c by passing the signal through a low-pass or band-pass filter to select the frequency band of the interest. The third sound analog processing 422c also amplifies the signal and outputs it to the third sound A/D converter 424c. The third sound A/D converter 424c converts the analog signal output from the third sound analog processing 422c to a digital third source signal and outputs it to the system processing unit 270. As described herein, outputs of the third sound acquisition unit 420c will be referred to as the "center sound signal." The third sound acquisition unit 420c can comprise discrete devices or can be integrated into a single device such as a digital output MEMS microphone.

Below, the first sound acquisition unit 420a, the second sound acquisition unit 420b, and the third sound acquisition unit 420c can be referred to overall as the "sound acquisition unit 420."

A field detection unit 432 includes the induction sensor 215, a field signal processing 434, and a field A/D Converter 436, and generates a field signal responsive to the presence of metal components picked up by the induction sensor 215. Field signal processing 434 amplifies desired aspects of the signal output from induction sensor 215 and outputs it to the field A/D converter 436. The A/D converter 436 converts the analog signal output from the field signal processing 434 to a digital first source signal and outputs it to the system processing unit 270. The field detection unit 432 may comprise discrete devices or may be integrated into a single device such as a digital output module or ASIC device.

A vibration detection unit 442 includes the one or more vibration sensors 255 a vibration signal processing 444, and a vibration A/D converter 446. The vibration detection unit 442 generates a vibration signal responsive to the vibration picked up by the vibration sensor 255. Vibration signal processing 444 filters the signal output from vibration sensor 255 by passing the signal through a low-pass or band-pass filter to select the frequency band of the interest. The vibration signal processing 444 also amplifies the signal and outputs it to the vibration A/D converter 446. The A/D converter 446 converts the analog signal output from the vibration signal processing 444 to a digital first source signal and outputs it to the system processing unit 270. The vibration detection unit 442 may comprise discrete devices or may be integrated into a single device such as a digital output module or ASIC device.

The transport driver unit 465 includes one or more motors and control logic required to enable the motors to rotate the urging roller 120, the feed roller 223, the take-away rollers 260, and the transport rollers 265 to transport the top sheet medium 117 along the media transport path 290.

The system memory 455 has a RAM (random access memory), ROM (read only memory), or other memory device, a hard disk or other fixed disk device, or flexible disk, optical disk, or other portable storage device. Further, the system memory 455 stores a computer program, database, and tables, which are used in various control function of the document scanner 10. Furthermore, the system memory 455 can also be used to store the captured images or processed images.

The system processing unit 270 is provided with a CPU (central processing unit) and operates based on a program which is stored in the system memory 455. The system processing unit 270 can be a single programmable processor or can be comprised of multiple programmable processors, a DSP (digital signal processor), LSI (large scale integrated circuit), ASIC (application specific integrated circuit), and/or FPGA (field-programming gate array). The system processing unit 270 is connected to the operator input 125, the operator display 128, first media sensor 205, second media sensor 210, ultrasonic detector 280, pod image acquisition unit 230, base image acquisition unit 234, first sound acquisition unit 420*a*, second sound acquisition unit 420*b*, third sound acquisition unit 420*c*, field detection unit 432, vibration detection unit 442, image processing unit 485, image buffer memory 475, network interface 445, system memory 455, transport driver unit 465.

The system processing unit 270 controls the transport driver unit 465, the pod image acquisition unit 230, and base image acquisition unit 234 to acquire a captured image. Further, the system processing unit 270 has a machine controller 430, an image controller 440, a sound jam detector 450, a position jam detector 460, a metal detector 495, a vibration detector 498 and a multi-feed detector 470. These units are functional modules may be realized by software operating on a processor. These units may also be implemented on independent integrated circuits, a microprocessor, DSP or FPGA.

The sound jam detector 450 executes the sound jam detection processing. In the sound jam detection processing, the sound jam detector 450 determines whether a jam has occurred based on a first sound signal acquired from the first sound acquisition unit 420*a*, a second sound signal acquired from the second sound acquisition unit 420*b*, and/or a third sound signal acquired from the third sound acquisition unit 420*c*. Situations in which the sound jam detector 450 determines that a media jam has occurred based on each signal, or a combination of signals, can be referred to as a "sound jam."

The position jam detector 460 executes the position jam detection processing. The position jam detector 460 uses second media detection signals acquired from the second media sensor 210, an ultrasonic detection signal acquired from the ultrasonic detector 280, and a timer unit 480, started when the transport driver unit 465 enables the urging roller 120 and the feed roller 223 to feed the top sheet medium 117, to determine whether a jam has occurred. The position jam detector 460 can also use pod image acquisition unit 230 and base image acquisition unit 234 to detect the lead-edge and trail-edge of the top sheet media 117. In this case, the image controller 440 outputs a lead-edge and trail-edge detection signal, which is combined with the timer unit 480, to determine whether a jam has occurred if the lead-edge and trail-edge detection signal are not asserted within a predefined amount of time. Situations in which the position jam detector 460 determines that a media jam has occurred based on the second media detection signal, the ultrasonic detection signal, pod image acquisition unit 230, or base image acquisition unit 234 can be referred to as a "position jam."

The multi-feed detector 470 executes multi-feed detection processing. In the multi-feed detection processing, the multi-feed detector 470 determines whether the feed module 225 has allowed multiple sheet media to enter the media transport path 290 based on an ultrasound signal acquired from the ultrasonic detector 280. Situations in which the multi-feed detector 470 determines that multiple sheet media entered the media transport path 290 can be referred to as a "multi-feed."

The metal detector 495 executes the metallic detection processing. The metal detector 495 uses metallic detection signals acquired from the field detection unit 432, to determine whether the sheet media contains metallic material. Situations in which the metal detector 495 determines that the sheet media entered the media transport path 290 contains metallic material may be referred to as a "metal detect exception".

The vibration detector 498 executes the vibration detection processing. The vibration detector 498 uses the vibration detection signals acquired from the vibration detection unit 442, to determine whether any vibration is detected by the vibration sensor 442. Situations in which the vibration detector 498 determines that the sheet media entered the media transport path 290 caused vibration may be referred to as a "vibration detect exception".

The machine controller 430 determines whether an abnormality condition, such as a medium jam, has occurred along a media transport path 290. The machine controller 430 determines that an abnormality has occurred when there is at least one of a sound jam, a position jam, metal detect exception, vibration detect exception, and/or a multi-feed condition. When an abnormality is detected, the machine controller 430 takes action based on the operators predefined configuration for abnormality conditions. One example of a predefined configuration would be for the machine controller 430 to inform the transport driver unit 465 to disable the motors. At the same time, the machine controller 430 notifies the operator of media jam using the operator control panel 122. Alternatively, the machine controller 430 may display an abnormality condition on the operator display 128 or issue an abnormality condition notice over the network interface 445, allowing the operator to manually take action to resolve the condition.

When a medium jam along a media transport path 290 has not occurred, the image controller 440 causes the pod imaging acquisition unit 230 and the base imaging acquisition unit 234 to image the top sheet medium 117 to acquire a captured image. The pod imaging acquisition unit 230 images the top sheet medium 117 via the pod image device 400, pod image A/D Converter 402, and pod pixel correction 404 while the base imaging acquisition unit 234 images the top sheet medium 117 via the base image device 410, base image A/D converter 412, and base pixel correction 414.

Figure 5:
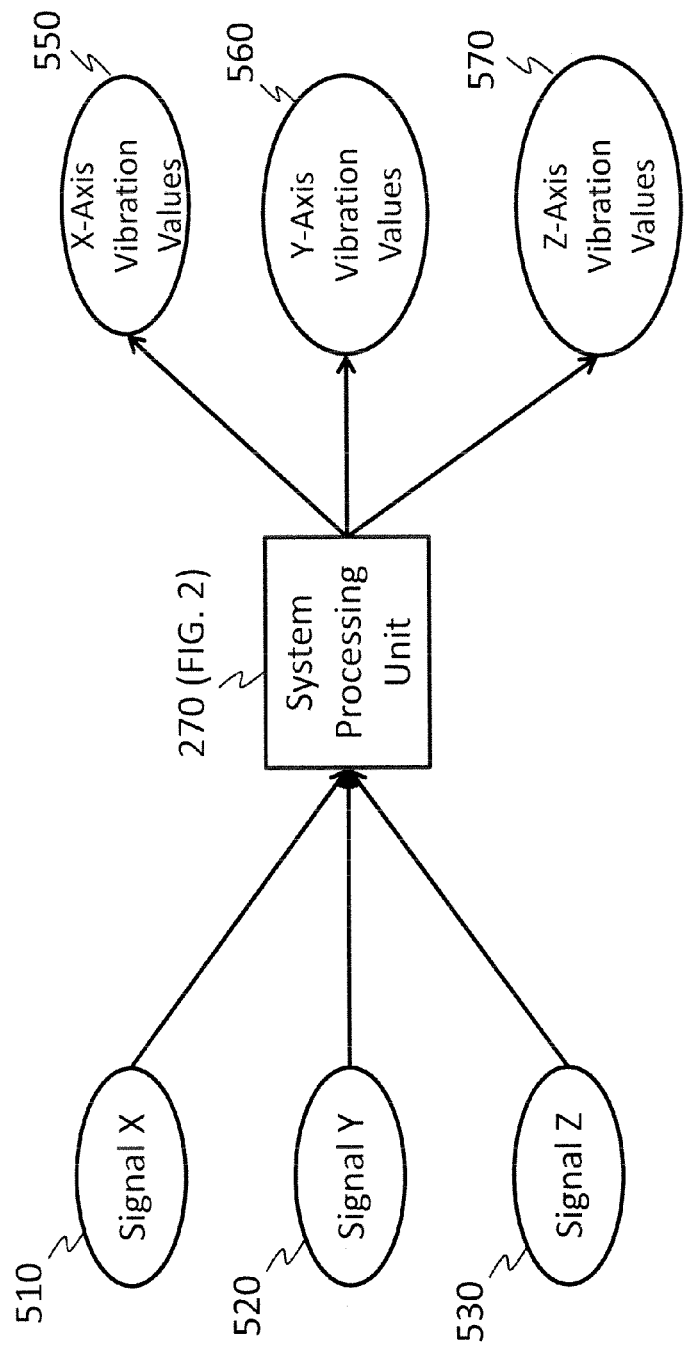
FIG. 5 is a diagram of the operation of a system processing unit for information input from a vibration detection unit.

FIG. 5 is a block diagram of the processing for a preferred embodiment of the present invention. One or more vibration sensors 255 detect vibrations associated with the rotational motions and deflections of the urging roller 120 and the feed roller 223 transmitted through the feed module 225, particularly as produced by the pulling of the top sheet medium 117 into the media transport path 290. The signal output from the vibration sensor 255, which may be an accelerometer or gyroscope, includes three signal components recording changes in speed, direction, or orientation along or about three orthogonal axes. These signals are shown in FIG. 5 as signal X 510, signal Y 520 and signal Z 530. System processing unit 270 produces X-axis vibration values 550, Y-axis vibration values 560, and Z-axis vibration values 570. The system processing unit 270 accounts for spurious influences including the effects of gravity. The effects of gravity are lessened, or removed, by normalizing all three axes to zero. This normalization may be done by computing a cumulative average of the data points from the channels. If the effects of gravity are not accounted, the large values due to gravity would skew channels, adding a bias to the information received. Normalizing also provides for smaller changes in vibrations to be detected.

A vibration is created when the sheet media moves through the media transport path 290 and suddenly stops due to a jam. Vibrations propagating in the feed module 225 can be detected by the vibration sensor 255 and used to determine a vibration detect exception. In this regard, one or more vibration sensors 255 are preferably mounted on the upper or lower transport guides 292, 294 or the upstream of the take-away rollers 260. This provides for the detection of sheet media jamming as the top sheet medium 117 enters the media transport path 290. Additional vibration sensors could be mounted elsewhere along the transport media path 290 to detect the location of vibrations by comparing the strength of vibration detected between multiple sensors.

Figure 6:
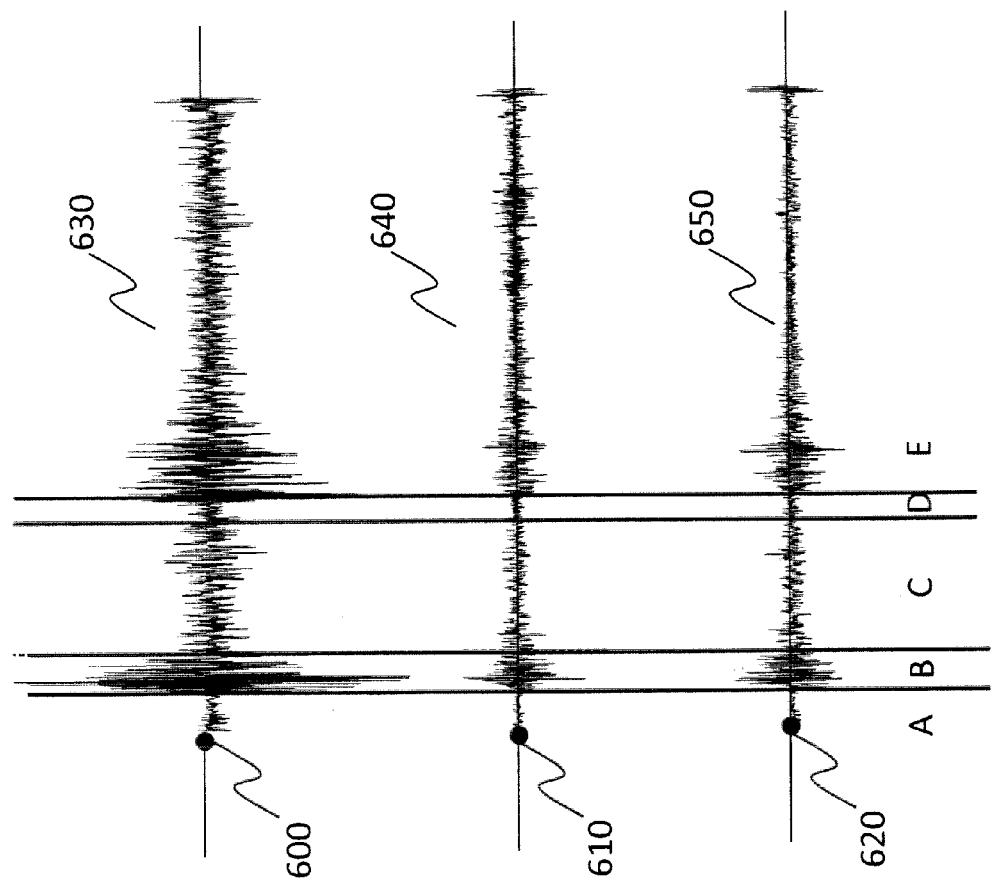
FIG. 6 is a plot of vibration values collected along three orthogonal axes during the initial advance of a sheet medium along the media transport system.

FIG. 6 represents a set of vibration values produced by a normal passage of the top sheet medium 117 along the media transport path 290 as detected by vibration sensor 255. Collectively the X-axis vibration values 550 represent the vibration profile 630, the Y-axis vibration values 560 represent the vibration profile 640, and the Z-axis vibration values 570 represent the vibration profile 650, all over a common span of time at the position of the vibration sensor 255.

Detection of the vibration associated with the transport of the top sheet medium 117 begins at points 600, 610 and 620 for the respective recorded vibration values 550, 560, and 570 taken along the orthogonal X, Y, and Z axes. Points 600, 610 and 620 mark the start of Region A corresponding to the machine controller 430 activating the transport driver unit 465 to engage the urging roller 120 to pull the top sheet medium 117 towards the feed roller 223 and the separator roller 220. Region A represents the vibration values captured in a delay between the machine controller 430 activating the transport driver unit 465 and the urging roller 120 actually rotating. Region B in FIG. 6 corresponds to the urging roller 120 starting to rotate and the pulling the top sheet medium 117 into the feed roller 223 and the separator roller 220. The duration of region B extends until the roller vibration noise, caused by the sudden change in velocity urging roller 120, and feed roller 223, dissipates into the background of the vibration noise from the top sheet medium 117. Region C corresponds to the top sheet medium 117 being selected and pushed towards the take-away rollers 260. At the end of region C, the top sheet medium 117 has reached the ultrasonic detector 280. Region D corresponds to the top sheet medium 117 after it passes the take-away rollers 260 and ends when the transport driver unit 465 de-activates the feed module 225 to prevent additional sheet media 115 from entering the media transport path 290. The separator roller 220 resists the feeding of addition sheet media 115, if present, and the next of the sheet media 115 to come to the top of the media stack in the input tray 110 is pre-staged at the separator roller 220. Region E in FIG. 6 corresponds to the top sheet medium 117 in the media transport path 290 after the feed module 225 is de-activated. Additional regions could be created by using additional sensors such as the second media sensor 210 to determine the location of the top sheet medium 117 within the media transport path 290.

Figure 7:
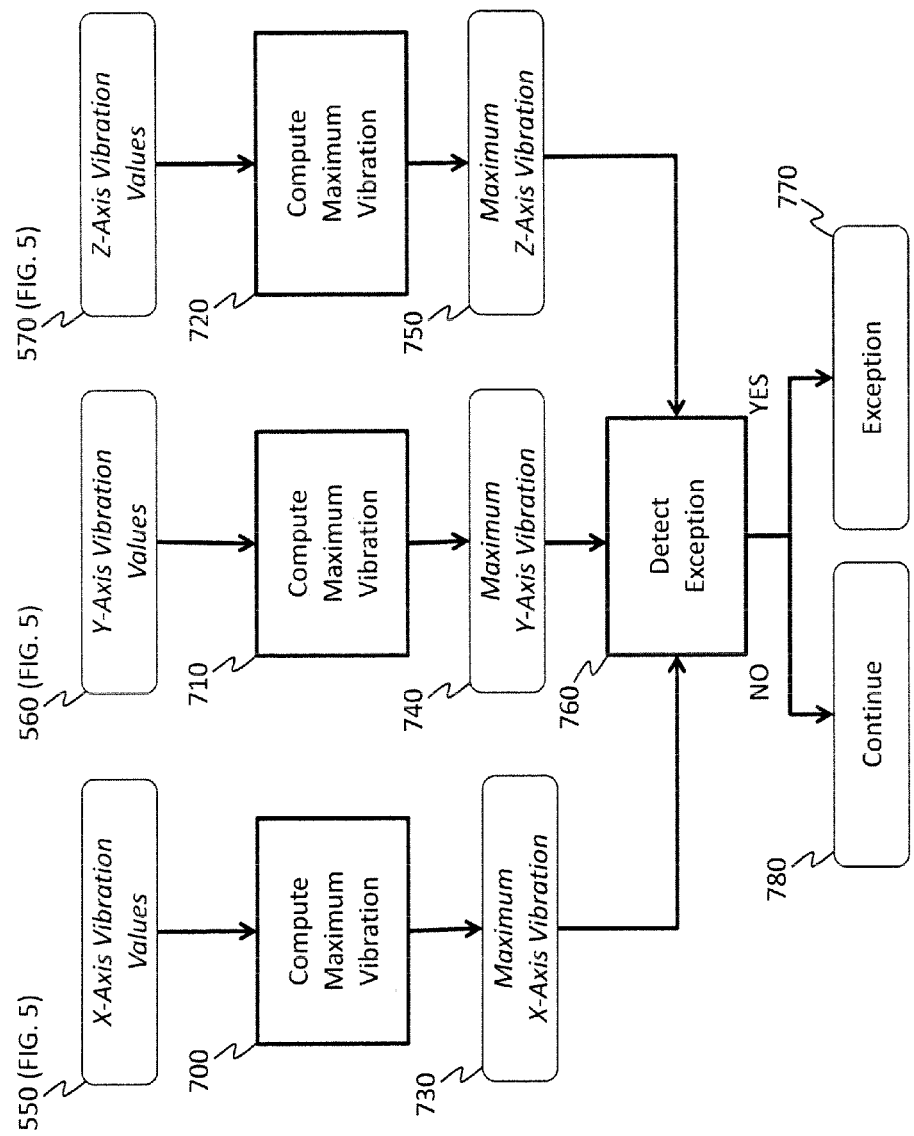
FIG. 7 is a flow chart showing the processing of vibration values for detecting a vibration exception.

A vibration exception detection region is used to define the region(s) of vibration values in vibration profiles shown in FIG. 6 where the vibration detector 498 executes the vibration detection processing on the vibration values looking for a vibration exception. FIG. 7 is a flowchart of vibration exception detection processing. A compute maximum vibration block 700 computes a maximum X-axis vibration 730 from the X-axis vibration values 550. A compute maximum vibration block 710 computes a maximum Y-axis vibration 740 from the Y-axis vibration values 560. A compute maximum vibration block 720 computes a maximum Z-axis vibration 750 from the Z-axis vibration values 570. An exception test block 760 tests the maximum X-axis vibration 730, the maximum Y-axis vibration 740, and the maximum Z-axis vibration 750 against respective thresholds. These thresholds may be a predetermined calibration value, as discussed in more detail below. A YES result from the test indicates a medium exception 770 has been detected. A NO result from the test indicates a medium jam has not been detected. The medium transport system continues operation through block 780 if a medium jam is not detected. Examples of a medium jam include stoppages of medium movement along the media transport path 290, multiple sheet media 115 being simultaneously fed into a media transport path 290 designed to convey only single medium of sheet media 115 at one time, and wrinkling, tearing, or other physical damage to the sheet media 115.

In FIG. 7, the compute maximum vibration block 700 computes the maximum X-axis vibration 730, which represents how much vibration was produced or the intensity of vibration produced from the X-axis vibration values 550. The maximum X-axis vibration 730 can be computed by a high amplitude count from the X-axis vibration values 550, as described, for example, in U.S. Patent Publication No. US2014/0251016, which is hereby incorporated by reference. The maximum X-axis vibration 730 can be represented by, for example, the maximum peak-to-peak amplitude or peak amplitude of the X-axis vibration values 550. The maximum X-axis vibration 730 can also be represented by any other comparison of characteristics or qualities of the X-axis vibration values 550. A moving window can be used to partition the X-axis vibration values 550 into frames that are collectively used together in the compute maximum vibration block 700. The moving window computes the maximum X-axis vibration 730 from the most recent $N_1$ X-axis vibration values 550 within the vibration detection region for the vibration profile 630, where $N_1$ is typically 1024. The compute maximum vibration block 700 begins at 600 and continues until a vibration exception is detected or the end of the X-axis vibration values 550 has been reached or the end of the vibration detection window is reached. When the urging roller 120 and the feed roller 223 initially start rotating, they produce a spike or burst of vibration noise, as shown in region B of the vibration profile 630. This spike is referred to as mechanical noise and is due to the mechanical parts of the urging roller 120 and the feed roller 223 going from stationary to a rotating motion. The compute maximum vibration block 700 ignores the X-axis vibration values 550 within region A or region B of the vibration profile 630 to avoid producing a false vibration exception based on the mechanical noise. Alternatively the compute maximum vibration block 700 can weight the X-axis vibration values 550 within region A or region B of the vibration profile 630 to reduce the chance of producing a false vibration exception.

The compute maximum vibration block 710 computes the maximum Y-axis vibration 740, which represents how much vibration was produced or the intensity of vibration produced from the Y-axis vibration values 560. The maximum Y-axis vibration 740 can be computed by a high amplitude count from the Y-axis vibration values 560, as described, for example, in U.S. Patent Publication No. US2014/0251016. The maximum Y-axis vibration 740 can be represented by, for example, the maximum peak-to-peak amplitude or peak amplitude of the Y-axis vibration values 560. The maximum Y-axis vibration 740 can also be represented by any other comparison of characteristics or qualities of the Y-axis vibration values 560. A moving window can be used to partition the Y-axis vibration values 560 into frames that are collectively used together in the compute maximum vibration block 710. The moving window computes the maximum Y-axis vibration 740 from the most recent $N_2$ the Y-axis vibration values 560 within the vibration detection region for the vibration profile 640, where $N_2$ is typically 1024. The compute maximum vibration block 710 begins at 610 and continues until a vibration exception is detected or the end of the Y-axis vibration values 560 has been reached or the end of the vibration detection window is reached. When the urging roller 120 and the feed roller 223 initially start rotating, they produce a spike or burst of vibration noise, as shown in region B of the vibration profile 640. This spike is referred to as mechanical noise and is due to the mechanical parts of the urging roller 120 and the feed roller 223 going from stationary to a rotating motion. The compute maximum vibration block 710 ignores the Y-axis vibration values 560 within region A or region B of the vibration profile 640 to avoid producing a false vibration exception based on the mechanical noise. Alternatively the compute maximum vibration block 710 can weight the Y-axis vibration values 560 within region A or region B of the vibration profile 640 to reduce the chance of producing a false vibration exception.

The compute maximum vibration block 720 computes the maximum Z-axis vibration 750, which represents how much vibration was produced or the intensity of vibration produced from the Z-axis vibration values 570. The maximum Z-axis vibration 750 can be computed by a high amplitude count from the Z-axis vibration values 570, as described, for example, in U.S. Patent Publication No. US2014/0251016. The maximum Z-axis vibration 750 can be represented by, for example, the maximum peak-to-peak amplitude or peak amplitude of the Z-axis vibration values 570. The maximum Z-axis vibration 750 can also be represented by any other comparison of characteristics or qualities of the Z-axis vibration values 570. A moving window can be used to partition the Z-axis vibration values 570 into frames that are collectively used together in the compute maximum vibration block 720. The moving window computes the maximum Z-axis vibration 750 from the most recent $N_3$ Z-axis vibration values 570 within the vibration detection region for the vibration profile 650, where $N_3$ is typically 1024. The compute maximum vibration block 720 begins at 620 and continues until a vibration exception is detected or the end of the Z-axis vibration values 570 has been reached or the end of the vibration detection window is reached. When the urging roller 120 and the feed roller 223 initially start rotating, they produce a spike or burst of vibration noise, as shown in region B of the vibration profile 650. This spike is referred to as mechanical noise and is due to the mechanical parts of the urging roller 120 and the feed roller 223 going from stationary to a rotating motion. The compute maximum vibration block 720 ignores the Z-axis vibration values 570 within region A or region B of the vibration profile 650 to avoid producing a false vibration exception based on the mechanical noise. Alternatively the compute maximum vibration block 720 can weight the Z-axis vibration values 570 within region A or region B of the vibration profile 650 to reduce the chance of producing a false vibration exception.

It should be noted that compute maximum vibration blocks 700, 710, and 720 do not have to use the same method to compute the maximum vibration of vibration values 550, 560 and 570. A different method can be used for each axis, including high amplitude count, peak-to-peak amplitude count, peak amplitude, average amplitude, and/or frequency.

Figure 8:
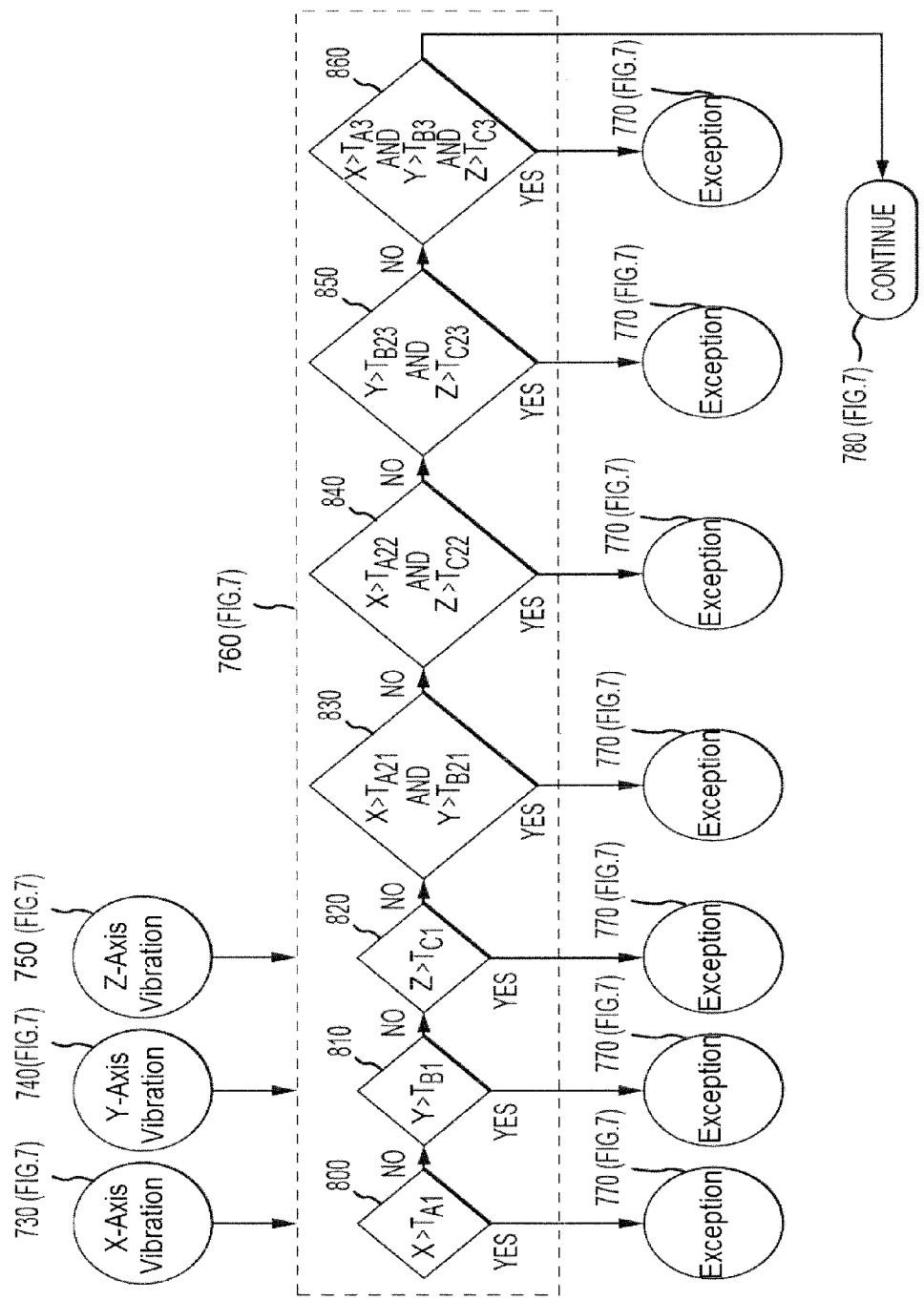
FIG. 8 is a flow chart showing a logic structure of an exception test block of FIG. 7.

FIG. 8 is a detailed diagram of the exception test block 760. Block 800 compares the maximum X-axis vibration 730 to vibration threshold $T_{A1}$. If the maximum X-axis vibration 730 is greater than the vibration threshold $T_{A1}$, an exception 770 is indicated. If the maximum X-axis vibration 730 is not greater than the threshold TAI, then the jam test moves to block 810, which compares the maximum Y-axis vibration 740 to vibration threshold $T_{B1}$.

If the maximum Y-axis vibration 740 is greater than the vibration threshold $T_{B1}$, an exception 770 is indicated. If the maximum Y-axis vibration 740 is not greater than the vibration threshold $T_{B1}$ then the jam test moves to block 820 which compares the maximum Z-axis vibration 750 to vibration threshold $T_{C1}$.

If the maximum Z-axis vibration 750 is greater than the vibration threshold $T_{C1}$, an exception 770 is indicated. If the maximum Z-axis vibration 750 is not greater than the vibration threshold $T_{C1}$ then the jam test moves to block 830, which compares the maximum X-axis vibration 730 to vibration threshold $T_{A21}$ and compares the maximum Y-axis vibration 740 to vibration threshold $T_{B21}$.

If the maximum X-axis vibration 730 is greater than the vibration threshold $T_{A21}$ and the maximum Y-axis vibration 740 is greater than vibration threshold $T_{B21}$, an exception 770 is indicated. If the maximum X-axis vibration 730 is not greater than the vibration threshold $T_{A21}$, or the maximum Y-axis vibration 740 is not greater than the vibration threshold $T_{B21}$, then the jam test moves to block 840 which compares the maximum X-axis vibration 730 to vibration threshold $T_{A22}$ and compares the maximum Z-axis vibration 750 to vibration threshold $T_{C22}$.

If the maximum X-axis vibration 730 is greater than the vibration threshold $T_{A22}$ and the maximum Z-axis vibration 750 is greater than vibration threshold $T_{C22}$, an exception 770 is indicated. If the maximum X-axis vibration 730 is not greater than the vibration threshold $T_{A22}$, or the maximum Z-axis vibration 750 is not greater than the vibration threshold $T_{C22}$, then the jam test moves to block 850, which compares the maximum Y-axis vibration 740 to vibration threshold $T_{B23}$ and compares the maximum Z-axis vibration 750 to vibration threshold $T_{C23}$.

If the maximum Y-axis vibration 740 is greater than the vibration threshold $T_{B23}$ and the maximum Z-axis vibration 750 is greater than vibration threshold $T_{C23}$, an exception 770 is indicated. If the maximum Y-axis vibration 740 is not greater than the vibration threshold $T_{B23}$ or the maximum Z-axis vibration 750 is not greater than the vibration threshold $T_{C23}$, then the jam test moves to block 860, which compares the maximum X-axis vibration 730 to vibration threshold $T_{A3}$, compares the maximum Y-axiS vibration 740 to vibration threshold $T_{B3}$, and compares the maximum Z-axis vibration 750 to vibration threshold $T_{C3}$.

If the maximum X-axis vibration 730 is greater than the vibration threshold $T_{A3}$ and the maximum Y-axis vibration 740 is greater than vibration threshold $T_{B3}$ and the maximum Z-axis vibration 750 is greater than vibration threshold $T_{C3}$, an exception 770 is indicated. If the maximum X-axis vibration 730 is not greater than the vibration threshold $T_{A3}$ or the maximum Y-axis vibration 740 is not greater than the vibration threshold $T_{B3}$ or the maximum Z-axis vibration 750 is not greater than the vibration threshold $T_{C3}$, then the jam test moves to continue 780.

In media processing apparatus such as the document scanner 10, many jams are often the result of poor preparation where the operator does not ensure that the multiple sheet media 115 are not attached together before they are placed into the input tray 110. The sheet media 115 can be attached together with, for example, staples, paper clips or adhesive.

A sheet media jam is most likely to occur when the top sheet medium 117 is being selected from the stack of sheet media 115 in the input tray 110 by the feed module 225 and is being fed into the media transport path 290 by the feed roller 223. The one or more vibration sensors 255 together with the third microphone 200C are ideally positioned for detecting a media jam in the area of the feed roller 223. Once the lead-edge of the top sheet medium 117 passes the take-away rollers 260, the probability of a media jam is reduced. As the trail-edge of the top sheet medium 117 approaches urging roller 120, the chance of a trail-edge jam begins increasing. During this time, the one or more vibration sensors 255 together with the first microphone 200a and the second microphone 200b are ideally positioned for detecting a media jam along the trail-edge of the top sheet medium 117.

For example, as the sheet media moves through the media transport path 290, the lead-edge of the top sheet medium 117 is pinched in the nip between the drive roller and normal force roller. When the lead edge of sheet media enters the nip, the lead-edge hits the drive roller and normal force roller, a spike or burst of audio noise and vibration is produced that can be detected within the audio and vibration profiles produced by the microphones 200 and the one or more vibration sensors 255. By combining information from the sound acquisition units 420 with information from the vibration detection unit 442, the sound jam processing can weight the digital source signal from the sound acquisition units 420 differently to reduce the possibility of false sound jam that result from the noise as the lead-edge of the top sheet medium 117 enters the nips.

Over time, the vibration profiles 630, 640, 650 as shown in FIG. 6 change as the mechanical components of the media transport path 290 wear. For example, the vibration profiles may become amplified as the parts wear and generate more vibration. When this occurs, the system can provide an audible or visual alert to the operator that maintenance or replacement of parts may be required. To detect or compensate for additional vibration introduced by mechanical components, a calibration procedure can be implemented within the document scanner 10. In region A of vibration profiles 630, 640, 650, the urging roller 120 has not started to urge the top sheet medium 117 into the feed roller 223. The X-axis vibration values 550, the Y-axis vibration values 560, and the Z-axis vibration values 570 within region A of FIG. 6 are used to detect any changes in the mechanical components of the media transport path 290 as well as changes in the vibration sensor pickup. In an alternative implementation, the gap between two consecutive top sheet media 117 could be used. In this case, the X-axis vibration values 550, the Y-axis vibration values 560, and the Z-axis vibration values 570 can be used after the trail-edge of the top sheet medium 117 has passed the first media sensor 205 as indicted by the first media detection signal.

Figure 9:
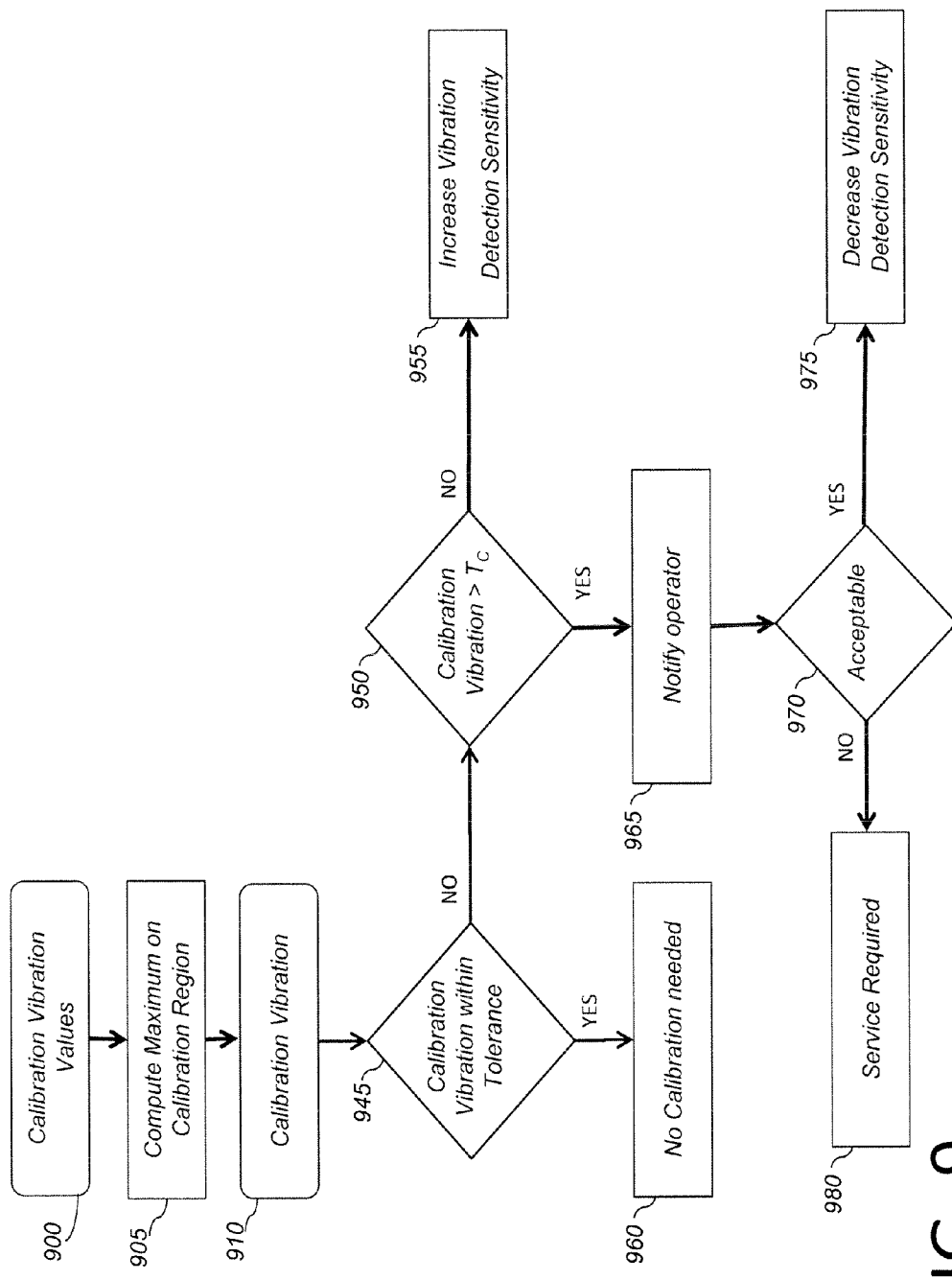
FIG. 9 is an illustration showing a calibration procedure that may be performed.

FIG. 9 is an example of a flowchart for a calibration process in the preferred embodiment for a single vibration sensor 255. The calibration process may be applied to each axes (X, Y and Z) of the vibration sensor individually, or may be applied to groups of vibration sensors. A compute maximum vibration on calibration region block 905 produces calibration vibration 910 from the vibration values 900 that represent the vibration values from region A of the vibration profiles shown in FIG. 6 for the vibration sensor 255. The size of region A of FIG. 6 may contain a limited number of samples to perform an effective calibration so the multiple vibration profiles can be concatenated together before being fed into the calibration process. Block 945 determines if the calibration vibration 910 is within an acceptable tolerance range. The acceptable range is typically ±50 ADC steps from the default calibration value stored in system memory 455, or a certain percentage of the full scale of the ADC. Note that each axis X, Y and Z can have a different default calibration value stored in system memory 455. If the calibration vibration is within an acceptable range then processing continues to block 960 where no calibration is needed. If the calibration vibration 910 is not with the acceptable range then processing continues to block 950 which determines if the calibration vibration 910 is greater than the default calibration value $T_C$ stored in system memory 455. If the calibration vibration 910 is not greater than the default calibration value $T_C$ then the vibration sensor is picking up less vibration than previously used in the vibration detection processing. To compensate for the reduction in the calibration vibration 910, the threshold values used by the vibration detection processing for that vibration sensor axis are decreased in block 955 to the increase the sensitivity of vibration detector 498. If the calibration vibration 910 is greater than the default calibration value then the medium transport system 10 is producing more vibration. This could be the result of a mechanical part becoming worn and is in need of replacement or there is a change in the sensitivity of the vibration sensor. The operator is notified in block 965 and has the option to accept the change in calibration vibration 910 in block 970. If the operator does not accept the change in calibration vibration 910 then the medium transport system 10 requires servicing as shown in block 980. If the operator accepts the increase in calibration vibration 910 then the vibration sensor is picking up more vibration than previous. To compensate for the increase in the calibration vibration 910, the threshold values used by the vibration detection processing for that vibration sensor are increased in block 975 to the decrease the sensitivity of vibration detector 498.

The initial thresholds $T_{A1}$, $T_{B1}$, $T_{C1}$, $T_{A21}$, $T_{B21}$, $T_{A22}$, $T_{C22}$, $T_{B23}$, $T_{C23}$, $T_{A3}$, $T_{B3}$ and $T_{C3}$ can be computed through a training process. The vibration profiles 630, 640 and 650 of the vibration sensor 255 are captured from the normal passage of sheet media 115 along the media transport path 290 to create a library of vibration profiles. The library consists of a collection of vibration profiles 630, 640 and 650 for $N_4$ sheet media 115 where $N_4$ is typically 250. The training process then analyzes the vibration profile 630, 640 and 650 for each sheet media 115 in the library and computes the maximum X-axis vibration 730, the maximum Y-axis vibration 740, and the maximum Z-axis vibration 750 over the library of vibration profiles. To find the thresholds used for multiple threshold tests 830-860, the vibration profiles are compared to each other to find the vibration values that produce the maximum vibrations along all three orthogonal axes X, Y, and Z.

The process is repeated while all but one of the vibration axis value is held constant. While holding one vibration value constant, the other vibration profiles are searched for vibration values that produce a vibration that is greater than the previous vibration found. If a greater vibration is found then that vibration value for the axis replaces the current vibration for that axis. The process continues searching the vibration profiles of each axis while holding the other vibration axis value constant.

These maximum vibration values are then used to set the thresholds $T_{A1}$, $T_{B1}$, $T_{C1}$, $T_{A21}$, $T_{B21}$, $T_{A22}$, $T_{C22}$, $T_{B23}$, $T_{C23}$, $T_{A3}$, $T_{B3}$ and $T_{C3}$. Since a library of vibration profiles was created using the normal passage of sheet media 115 through the media transport path 290, an exception 770 would be indicted anytime the X-axis vibration values 550, the Y-axis vibration values 560, and the Z-axis vibration values 570 produce a maximum X-axis vibration 730, a maximum Y-axis vibration 740, and a maximum Z-axis vibration 750 that exceeded the threshold tests as described in FIG. 8.

The operator can put the media transport path 290 into a training mode to allow for optimization of thresholds to match the type of sheet media 115 being loaded into the input tray 110. The thresholds $T_{A1}$, $T_{B1}$, $T_{C1}$, $T_{A21}$, $T_{B21}$, $T_{A22}$, $T_{C22}$, $T_{B23}$, $T_{C23}$, $T_{A3}$, $T_{B3}$ and $T_{C3}$ can be generic thresholds meaning that the thresholds will work for wide range of types of sheet media 115. They can also be custom thresholds meaning that thresholds $T_{A1}$, $T_{B1}$, $T_{C1}$, $T_{A21}$, $T_{B21}$, $T_{A22}$, $T_{C22}$, $T_{B23}$, $T_{C23}$, $T_{A3}$, $T_{B3}$ and $T_{C3}$ are defined for a specific type of sheet media 115. For example, a media transport path 290 could be processing only 110# card stock media. In this case, the training would be done using only 110# card stock media in order to optimize the thresholds for this type of media. Whenever a media transport path 290 restricts its use to a particular set of types of media, the training can be done using only those media types to optimize the thresholds. Alternatively each of the thresholds can be set as a mixture of generic and custom thresholds across the entire vibration profile thereby allowing the vibration detection processing to use custom thresholds specific to a type sheet media in specific regions of the vibration profiles 630, 640 and 650.

In addition, the thresholds can be set specifically for each media transport path 290. In this case, each different media processing apparatus can produce a vibration profile for sheet media 115 that is unique to that system. Alternatively, the thresholds $T_{A1}$, $T_{B1}$, $T_{C1}$, $T_{A21}$, $T_{B21}$, $T_{A22}$, $T_{C22}$, $T_{B23}$, $T_{C23}$, $T_{A3}$, $T_{B3}$ and $T_{C3}$ can be global thresholds meaning that the thresholds will be applied across the entire vibration profile. They can also be local thresholds meaning that thresholds $T_{A1}$, $T_{B1}$, $T_{C1}$, $T_{A21}$, $T_{B21}$, $T_{A22}$, $T_{C22}$, $T_{B23}$, $T_{C23}$, $T_{A3}$, $T_{B3}$ and $T_{C3}$ are defined for a specific region A-E, thereby handling unique characteristics of the various sections of the media transport path 290. Unique characteristics of the media transport path 290 can be of any form known to those skilled in the art including, but not limited to, change in roller material, rollers speed, bends or curves within the media transport path 290.

Figure 10:
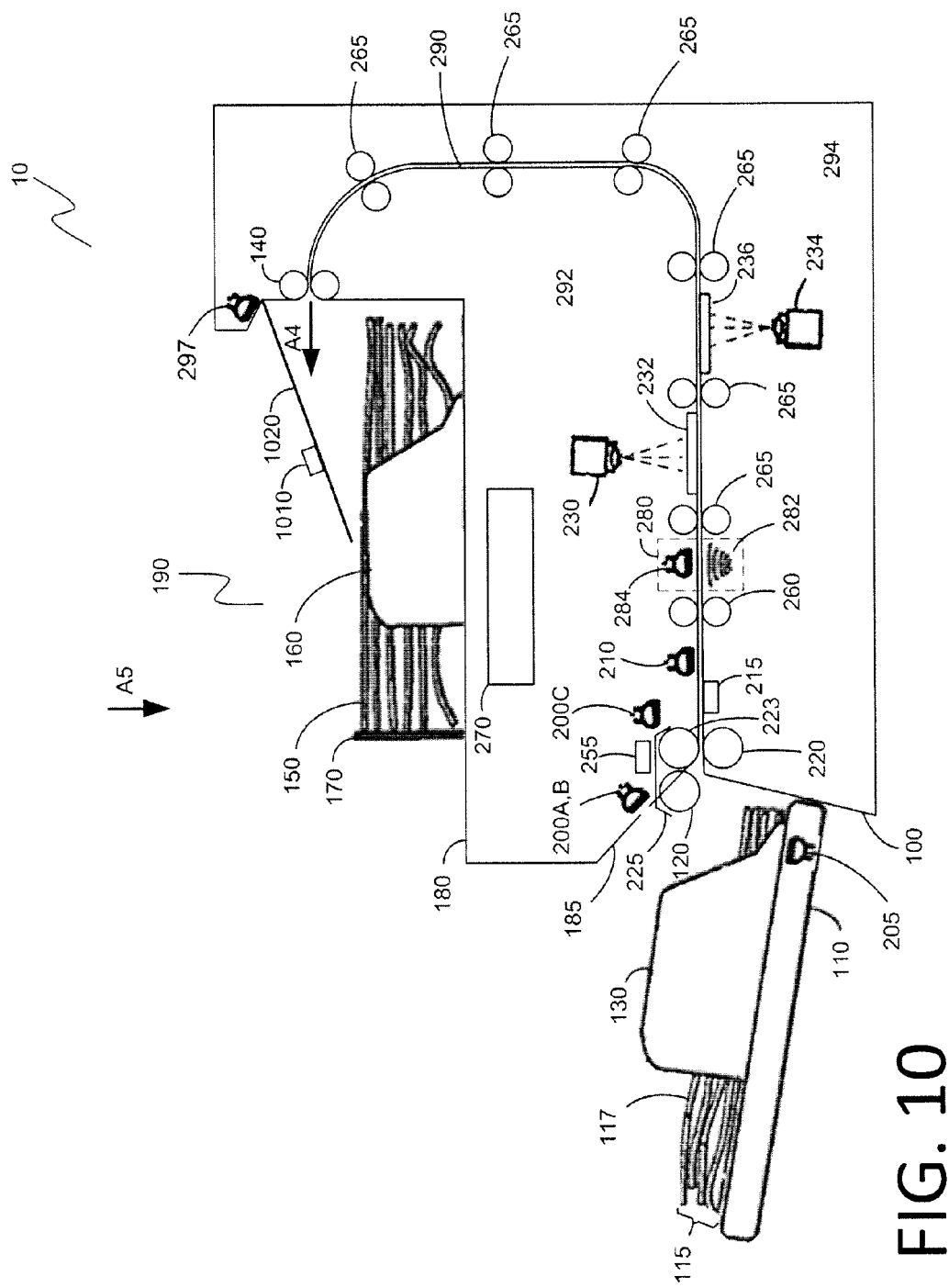
FIG. 10 is a diagram showing components of an alternative media transport system for the media processing apparatus of FIG. 1.

FIG. 10 illustrates additions to the media transport path 290 between the output transport rollers 140 and the output tray stop 170. An output guide flap 1020 deflects individual sheet media into the output tray 190. The output guide flap 1020 is attached at the end of the media transport path 290 in such a way as to control the sheet media placed into the output tray 190.

A vibration sensor 1010 may be mounted on the output guide flap 1020 to monitor the output of sheet media from the media transport path 290 into the output tray 190. By placing the vibration sensor 1010 on the output guide flap 1020, the output of the sheet media into the output tray 190 can be confirmed. The output of the vibration sensor can also be monitored to count the number of sheets or otherwise detect the fullness state of the output tray 190. For example, as the output tray 190 becomes full, the inclination of the vibration sensor 1010 on the output guide flap 1020 changes. In addition, the vibration sensor 1010 can monitor unexpected changes to the deflection or orientation of the output guide flap 1020 to detect instances in which the sheet media exiting the media transport path 290 rolls over or does not stack properly in the output tray 190. For example, the vibration sensor 1010 can detect if the guide flap 1020 does not return to its expected position as an indication of a problem in the loading of the output tray 190. A warning can be generated at the start of a new batch of sheet media 115 added to the input tray 110 if the output guide flap 1020 is not in a position indicating the output tray 190 is empty. This prevents the feeding of a new batch of sheet media into the media transport path 290 before the previous batch of sheet media has been removed from the output tray 190.

The vibration sensor 1010 is preferably an accelerometer to monitor impacts of the individual sheet media ejected from the media transport path 290, although other types of vibration sensors may be used. Vibrational values from the vibration sensor, which operates via a vibration detection unit similar to the vibration detection unit 442, can be monitored for abnormalities indicating problems associated with the ejection of the sheet media from the media transport path 290 or the stacking of the output sheet media 150 in the output tray 190.

Alternatively, the vibration sensor 1010 or another vibration sensor could be mounted in or on the output tray 190 or any of it various components including the output tray stop 170. The timing of expected vibration peaks monitored by the vibration sensor 1010 can be compared to the timing of expected vibration peaks monitored by vibration sensor 255 to identify timing errors indicative of problems in the media transport path 290 between the input and output of the individual sheet media.

Vibration sensors could also be added in other locations along the media transport path 290 to monitor for abnormal vibrations, particularly in the form of vibrations that vary from an expected amplitude, pattern, or timing between events. For example, vibrations sensors can be located in a variety of positions along the media transport path 290, including in various positions on the upper media guide 292 and the lower media guide 294, particularly in positions in mechanical communication with the components of the media transport path that contribute to the movement of the sheet media or respond to movement of the sheet media. Vibration sensors can also be mounted in positions at or near the entrance and exit of the media transport path 290 including positions in mechanical engagements with the components of the input tray 110 and output tray 190.

Vibration values monitored by the vibration detection unit 442 can be interpreted by the system processing unit 270 together with sound values monitored by the sound acquisition units 420 to more accurately detect jams along the media transport path 290. For example, when the urging roller 120 and feed roller 223 initially start rotating, they produce a spike or burst of audio noise accompanying the vibration profile as shown in region B of FIG. 6. This audio noise spike is referred to as mechanical noise and is due to the mechanical parts of the urging roller 120 and feed roller 223 going from stationary to a rotating motion. The location and duration of this mechanical noise is difficult to predict. However, vibration sensor 255 can detect the vibration from the mechanical parts. By combining information from the vibration detector 498 with information with the audio profiles from the sound acquisition units 420, the sound jam detector 450 can weight the digital source signal from the sound acquisition units 420 differently to reduce a false sound jam resulting from the spike or burst of audio noise from the urging roller 120 and feed roller 223.

Output of the vibration detection unit 442 can also be monitored to detect physical abuse of the document scanner 10 such as by monitoring for extreme shocks or motions beyond the range for which the scanner 10 is designed to accommodate. The system processing unit 270 can respond in a number of ways including creating a log of such events, provide a warning that such an event has taken place, or perform a system check to determine if damage has been sustained.

The invention claimed is:

1. A method of monitoring transport of a sheet media though a media processing apparatus comprising steps of:
conveying at least one sheet media with a transport apparatus including one or more rollers from a queue mechanism along a medium transport path;
detecting a vibration propagating in the media processing apparatus using at least two vibration sensors, with a first vibration sensor detecting vibration on at least one support structure for a roller and a second vibration sensor detecting vibration in an ejection proximate to an output tray for receiving the sheet media advanced by the transport apparatus, and generating detected vibration signals;
analyzing, in a processing system, the detected vibration signals, wherein the analyzing includes determining whether the detected vibration signals are associated with normal handling of sheet media in the media processing apparatus or whether the detected vibration signals are associated with abnormal handling of the sheet media; and
signaling an error condition to a control system in response to determining that the detected vibration signals are associated with abnormal handling of the sheets.

2. The method of claim 1, wherein the step of analyzing includes comparing the detected vibration signals to vibration characteristics known to be associated with the abnormal handling of the sheet media.

3. The method of claim 1, further including discontinuing the advancing of the sheet media in response to the signaling of an error condition.

4. The method of claim 1, wherein the rollers include drive rollers for imparting motion to the sheet media, and wherein the first vibration sensor is mounted on a support structure for at least one of the drive rollers.

5. The method of claim 4, wherein the transport apparatus includes a feed module for drawing sheet media from the queue mechanism, and wherein at least one drive roller is a part of the feed module.

6. The method of claim 5, wherein, detecting vibration signals includes detecting vibration in the feed module.

7. The method of claim 4, wherein at least two vibration sensors are mounted on first and second support structures.

8. The method of claim 7, wherein analyzing the detected vibration signals includes distinguishing between normal handling of the sheet media by one of the first and second support structures from abnormal handling of the sheet media by the other of the first and second support structures.

9. The method of claim 8 in which the first support structure is positioned closer to the queue mechanism than the second support structure, and further comprising sequentially disengaging the drive rollers associated with the first and second support structures in response to the signaling of an error condition associated with the first support structure and not the second support structure.

10. The method of claim 1, wherein the at least two vibration sensors sense variations in at least one of position, acceleration, and stress.

11. The method of claim 1, wherein the second sensor is mounted on a guide flap that guides the sheet media into the output tray.

12. The method of claim 1, wherein analyzing the detected vibration signals includes separately analyzing the detected vibration signals from each of the first and second vibration sensors.

13. The method of claim 1, further comprising detecting sound values associated with the engagement of the rollers with sheet media, and analyzing the detected sound values together with the detected vibration signal values for distinguishing between detected vibration associated with normal handling of sheet media and detected vibration associated with abnormal handling of sheet media.

14. The method of claim 13, wherein detecting sound values includes detecting sound values from a microphone responsive to sounds associated the engagement of the rollers.

15. A media processing apparatus comprising:
a transport apparatus for advancing sheet media from a queue mechanism through one or more media processing stages to an ejection mechanism, wherein the transport apparatus includes rollers for engaging the sheet media and support structures for rotatably supporting the rollers;
at least two vibration sensors for detecting a vibration, including a first vibration sensor and a second vibration sensor, wherein the second vibration sensor is mounted on the ejection mechanism;
a processing system configured to analyze the detected vibration signals during the advancing of the sheet media for determining whether the detected vibration signals are associated with normal handling of sheet media or with abnormal handling of sheet media; and
a control unit that receives an error condition signal from the processing system in response to determining that the detected vibration signals are associated with abnormal handling of the sheet media.

16. The media processing apparatus of claim 15, wherein the processing system is configured to compare the detected vibration signals to vibration characteristics known to be associated with abnormal handling of the sheet media.

17. The media processing apparatus of claim 15, wherein the control unit discontinues the advancing of the sheet media with the transport apparatus in response to the signaling of an error condition.

18. The media processing apparatus of claim 15, wherein the rollers include drive rollers for imparting motion to the sheet media.

19. The media processing apparatus of claim 18, wherein at least one drive roller separates sheet media from the queue mechanism, wherein the at least two vibration sensors includes a vibration sensors mounted on the support structure rotatably supporting the drive roller separating the sheet media from the queue mechanism, and wherein the processing system is configured to analyze detected vibration signals as the sheet media are first advanced into the transport apparatus.

20. The media processing apparatus of claim 18, wherein the at least two vibration sensors includes a first vibration sensor mounted on a first support structure and a second vibration sensor mounted on a second support structure.

21. The media processing apparatus of claim 20, wherein the first and second vibration sensors separately detect vibration in the first and second support structures.

22. The media processing apparatus of claim 21, wherein the processing system analyzes the detected vibration signals in each of the first and second support structures during the advancing of the sheet media by the drive rollers.

23. The media processing apparatus of claim 22, wherein the processing system distinguishes between normal handling of the sheet media by one of the first and second support structures from abnormal handling of the sheet media by the other of the first and second support structures.

24. The media processing apparatus of claim 23, wherein the first support structure is positioned closer to the queue mechanism than the second support structure, and wherein the control unit is configured to sequentially disengage the drive rollers associated with the first and second support structures in response to the signaling of an error condition associated with the first support structure and not the second support structure.

25. The media processing apparatus of claim 15, wherein the at least two vibration sensors sense variations in at least one of position, acceleration, and stress in the one support structure.

26. The media processing apparatus of claim 15, further comprising at least one microphone for detecting a sound of the sheet media being advanced by the transport apparatus.

27. The media processing apparatus of claim 26, wherein the rollers include drive rollers within a feed module for separating sheet media from the queue mechanism, and wherein the at least one microphone is configured to detect a sound of the sheet media being advanced through the feed module.

28. The media processing apparatus of claim 15, wherein the second sensor is mounted on a guide flap that guides the sheet media into an output tray.

* * * * *

UNITED STATES PATENT AND TRADEMARK OFFICE
CERTIFICATE OF CORRECTION

PATENT NO. : 9,850,084 B2
APPLICATION NO. : 14/919556
DATED : December 26, 2017
INVENTOR(S) : Middleton et al.

Page 1 of 1

It is certified that error appears in the above-identified patent and that said Letters Patent is hereby corrected as shown below:

In the Claims

Column 23, Line 3, Claim 1 "though a media" should read --through a media--.

Column 23, Line 26, Claim 1 "sheets" should read --sheet media--.

Column 24, Line 10, Claim 14 "associated the" should read --associated with the--.

Column 24, Line 46, Claim 19 "includes a vibration" should read --include a vibration--.

Signed and Sealed this
Twenty-second Day of January, 2019

Andrei Iancu
*Director of the United States Patent and Trademark Office*